United States Patent Office
3,503,953
Patented Mar. 31, 1970

3,503,953
FIBER REACTIVE DYES CONTAINING AT LEAST ONE METHYLOLATED, ALKOXYMETHYLOLATED OR ACYLOXYMETHYLOLATED IMINOBIS PROPIONAMIDE GROUP
Frank Fred Loffelman, Middlesex, N.J., assignor to American Cyanamid Company, Stamford, Conn., a corporation of Maine
No Drawing. Continuation-in-part of application Ser. No. 420,448, Dec. 22, 1964. This application Dec. 27, 1967, Ser. No. 693,720
Int. Cl. C09b 62/74, 62/72; D06p 3/60
U.S. Cl. 260—153                  11 Claims

ABSTRACT OF THE DISCLOSURE

A class of reactive dyes is prepared which is capable of forming a covalent linkage with an active hydrogen-containing substrate, notably cellulose, thereby affording a dyeing of greatly improved fastness properties. These dyes are characterized by the presence of at least one methylolated, alkoxymethylolated or acyloxymethylolated iminobis (propionamide) residue attached to the chromophoric portion of the molecule by an appropriate bridging group. The reaction with the substrate is effected by heat in the presence of an acid catalyst.

---

This application is a continuation-in-part of application Ser. No. 420,448, filed Dec. 22, 1964, now abandoned which in turn is a continuation-in-part of application Ser. No. 335,682, filed Jan. 3, 1964, now abandoned.

This invention relates to an improvement in the field of dyes. More particularly, it relates to the provision of new dyes which can be chemically bonded to polymeric substrates. It relates also to the method by which the dyes are prepared and the method by which they are applied. Still further, it relates to dyed polymeric substrates in which the dyes of this invention are chemically bonded to said substrates. Still more particularly, the present invention relates to the provision of dyes characterized by the presence of at least one methylolated, alkoxymethylolated or acyloxymethylolated iminobis (propionamide) residue attached to the chromophoric portion of the molecule by an appropriate bridging group. The invention further relates to a method by which the foregoing dyes are chemically reacted with a polymeric substrate having reactive hydrogens, e.g., cellulose; and to the resulting dyed substrate.

It is known that dyes can be reactively applied to polymeric materials as contrasted to a physical application in which the attraction of the dye for the polymer is not derived from any chemical combination. Several approaches to the problem of finding suitable methods of chemically attaching the dye to the substrate have heretofore been known. These approaches are, of course, governed by the reactivity of the polymeric substrate to be dyed. For substrates characterized by recurring active hydrogens, such as cellulose (either natural or regenerated), the dye should be chemically capable of entering into a condensation reaction. One known reactive group for bonding dye residues to cellulose is the 2,4-dichlorotriazinyl radical. The chemical bonding of such dyes to cellulose is accomplished by contacting the materials under conditions such that hydrogen chloride is eliminated.

Another reactive group which has been investigated is the methylol group. When a methylol-containing dye is contacted with cellulose under the proper conditions, water is eliminated and the dye becomes bonded through an ether linkage to the cellulosic backbone. Such known reactive dyes have not received wide commercial acceptance as yet, perhaps because, in practice, the resultant linkage with the fiber has not been as stable for practical purposes as could be desired.

The present invention resides in the area of "methylolated reactive dyes." It is based upon the discovery that the reactivity of the methylol group with "active hydrogen" of the polymeric substrate, is vastly improved by, in effect, interposing an activating linkage as hereinafter defined between the aromatic dye moiety and the reactive methylol radical. While the concept of an activated linkage is not broadly new with the present invention, the particular linkage of the present invention is remarkably more capable of performing the activating function than was heretofore thought possible. By modifying the dye in accordance with the present invention, a greater degree of reactivity of the dye with the polymeric substrate is obtained, and, once reacted, a stronger attachment to the substrate results. Dyeings of polymeric substrates obtained with the modified and chemically reactive dyes of the present invention have much better wet-fastness than if the dye moiety had been applied by physical application methods. Surprisingly, the dyes of the present invention are much more stably bonded to polymeric substrates than even very similar methylol-modified dyes which lack the specific activating linkage of the present invention. Indirectly, it is a great advantage of the present invention that the dyes can be prepared under relatively mild reaction conditions, and, thus, there is a minimum disruption of the chromophoric or fluorophoric character of the starting material. This factor contributes to the commercial attractiveness of the dyes of this invention.

The activating linkage which is the underlying discovery of the present invention is represented by the following Formula I:

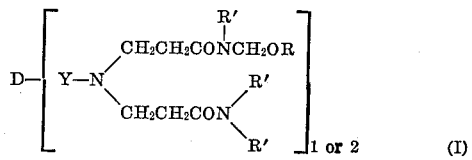

The linkage itself is the radical located in the brackets between the aromatic dyestuff residue "D" and the R' and methylol moiety "CH$_2$OR" wherein R is hydrogen, an acyl or an alkyl group of 1–4 carbon atoms. Each "R'" is either hydrogen or CH$_2$OR. In the activating linkage, the symbol "Y" is intended to represent a bridging group such as a covalent bond, sulfonyl (—SO$_2$—), alkylenesulfonyl (—alk-SO$_2$—), alkyleneoxy (—alk-O—), alkylenethio (alkylene-S—), carbonyl (—CO—), alkylenecarbonyl (—alk-CO—) or alkylene. The "alkylene" radical in the case of the bridging group should have either one or two carbon atoms. As can be noted, the number of methylol (or alkoxymethyl or acyloxymethyl) groups can range between one and four. At least one such group must be present to obtain any of the advantages of the present invention. As many as four may be present with excellent results, but such complete methylation is sometimes difficult to obtain and is often unnecessary, since about two methylol groups give a very desirable degree of reactivity with a polymeric substrate. The methylolation step leading to the dyes of this invention may lead to a reaction product containing mixtures of monomethylolated, dimethylolated, trimethylolated and tetramethylolated molecules. Such mixtures, when they occur, will be designated hereinafter by indicating the average methylolation in the product. The average may sometimes be a fractional number.

Compounds of Formula I are especially useful for dyeing polymers characterized by a reactive hydrogen, with which they can react. Among this type of material are cellulosics (natural forms such as cotton and paper and synthetic forms such as rayon, acetate, etc.), polyamides (natural forms, such as wool and synthetic forms such as nylon), and polyurethanes. In the present stage of polymer technology, the dyes of this invention are most notably useful for use on paper and cotton.

As stated above, the present invention is generally applicable regardless of the specific structure of the dye. At this point, it should be noted that the term "dye" as used herein, is intended to include fluorophoric dyes which are sometimes known as "optical brighteners." Among the classes of dyes which can be applied to the present invention are acridine, anthraquinone, azine (e.g., pyridine and quinoline dyes), azo (mono- or poly-, metallized or unmetallized), azoic, azomethine, cyanine, diarylmethane, indamine, indophenol, indigoid, keto, amino or hydroxy lactone, methine or polymethine, nitro, nitroso, oxazine, oxazole (benzo- or naphtho-), triazole (benzo- and naphtho-), phthalocyanine (and metal derivatives), quinoline, quinone (benzo- or naphtho-), stilbene, sulfur, thiazine, thiazole, triarylmethane, xanthene, and benzidine sulfone. The aromatic moieties of these dyes may be substituted with conventional chromophoric and auxochromic radicals as are well-known in the art, and these latter are perfectly inert with respect to the reactivity imparted to the moiety by the present invention. Most often, the dye moiety "D" will be chosen from anthraquinone, azo, nitro, phthalocyanine, azine, and triarylmethane dyes, since these classes are most widely desired because of the range of colors which they are capable of imparting.

In preferred cases, the dyes contain solubilizing groups. These may be either non-ionizing or ionizing groups. If non-ionizing, such groups may be hydrophilic residues such as hydroxyalkyl (including the methylol groups themselves), polyhydroxyalkyl, carbamoyl, sulfamoyl, alkylsulfonyl, phosphonamoyl, sulfinamoyl, sulfenamoyl and the like. If ionizing, such solubilizing groups may be sulfonic, carboxylic, phosphonic and the like, in free acid form or in the form of an alkali metal (e.g., sodium and potassium) or ammonium salt. Or the ionizing groups may be quaternary ammonium or phosphonium, or ternary sulfonium groups, in the form of salts with chloride, iodide, methosulfate, tosylate, or other anions.

Because the preferred dyes of the present invention are compounds wherein D is the radical derived from an azo, and anthraquinone, or a phthalocyanine dye, these will be outlined in more detail.

The azo dye residues for the new dyes of this invention are derived from various aromatic diazo components and coupling components. The components may contain at least one methylolatable reactive linkage or an immediate precursor thereof; or, the methylolatable reactive linkage may be introduced into the dye after the coupling operation.

Examples of the diazotizable amines containing the methylolatable group which may be used to form the diazo components are: 3,3'-(metanilylimino)bispropionamide; 3 - amino-4-methoxy-N,N-bis(2-carbamoylethyl) benzenesulfonamide; o - amino - N,N-bis(2-carbamoylethyl)benzenesulfonamide; p - amino - N,N-bis-(2-carbamoylethyl)benzenesulfonamide; 4 - chloro-3-nitro-N, N - (2 - carbamoylethyl)benzenesulfonamide; 3,3' - (p-aminophenylimino) bispropionamide; m- and p-amino-N,N - bis(2 - carbamoylethyl) - benzamide; 3,3'-{[2-(N-ethyl - m - toluidino)ethyl]imino}bispropionamide; 3,3'-{[2 - (3 - amino - 4-sulfoanilino)-4-hydroxy-s-triazin-6-yl]imino}bispropionamide.

Amines may be diazotized and used in the present invention even if they do not contain the activating methylolatable linkage. Such amines can be coupled with methylolatable coupling components. Alternately, if the coupler does not have the activating linkage, the linkage can be hooked into it. Examples of the amines which do not have a methylolatable activating linkage and may be used to form the diazo components are: aniline, o-nitroaniline, m-nitroaniline, p-nitroaniline, o-, m-, and p-chloroaniline, 2-nitro-4-chloroaniline, 2-amino-5-nitrotoluene, 4-amino-3-nitrotoluene, 2-amino-4-nitrotoluene, 2-amino-5-chlorotoluene, 2-amino-4-chlorotoluene, 2-amino-6-chlorotoluene, 2,5-dichloroaniline, 3,4-dichloroaniline, 3-amino-4-chlorotoluene, o-, m- and p-anisidine, 3-nitro-4-methoxyaniline, 4-nitro-2-methoxyaniline, 2-nitro-4-ethoxyaniline, dianisidine, 1-amino-2,5-diethoxy-4-benzoylaminobenzene, 4-amino - 1 - benzoylamino-2,5-dimethoxybenzene, benzidine (including monoacyl derivatives), tolidine, 4-chloro-2-methoxyaniline, 1,5-dimethoxy-2-amino-4-chlorobenzene, 1-methoxy - 2 - benzoylamino-4-chloro-5-aminobenzene, 1-naphthylamine, 1-aminoanthraquinone, 1-amino - 3 - chloroanthraquinone, 3-amino-4-methoxybenzenesulfondiethylamide, 4 - methoxy-2-aminophenylethylsulfone, 4-benzoylamino - m - xylidine, 4-methoxy-4'-aminodiphenylamine, 4-aminodiphenylamine, 4-chloro-2-aminodiphenyl ether, 4,4-dichloro - 2 - aminodiphenyl ether, o-aminodiphenylamine, 2,6,4'-trimethyl-3'-nitro-4-aminoazobenzene, 5 - methyl-4-methoxy-2-amino-2'-chloro-4'-nitroazobenzene, 4-phenylazo - 1 - naphthylamine, m- and p-aminoacetanilide, N-benzoyl-m- and p-phenylenediamine, sulfanilamide, metanilamide, orthanilamide, m- and p-amino-N-methylacetanilide, o-, m- and p-aminobenzamide, 4- and 5-aminosalicylamide, 2-aminophenol-4-sulfonic acid, 6-amino-4-nitrophenol-2-sulfonic acid, 2-aminophenol-4- or 5-sulfonamide, 2-amino-2'-methyldiphenyl-ether-4-sulfonic acid, 4-aminoazobenzene, 4-aminoazobenzene-4'-sulfonic acid, 4-aminoazobenzene-3,4'-disulfonic acid, orthanilic acid, metanilic acid, sulfanilic acid, 6-methylmetanilic acid, 2-amino-5-chloro-4-methylbenzenesulfonic acid, 5-chloroorthanilic acid, aniline-2,5-disulfonic acid, 4-chloro-5-methylorthanilic acid, 4-methoxyorthanilic acid, 2,4-dimethylaniline-6-sulfonic acid, 2-amino-4-trifluoromethylbenzene-sulfonic acid, 3,4-dichloroaniline-6-sulfonic acid, 3,5-dichloroaniline-6-sulfonic acid, 3-methoxyaniline-6-sulfonic acid, 4-methylaniline-2-sulfonic acid, dehydrothiotoluidine-sulfonic acid, 2-aminonaphthalene-4,8-disulfonic acid, 2-aminonaphthalene-6-sulfonic acid, 2-aminonaphthalene-6,8-disulfonic acid, 2-amino-1-naphthol-4-sulfonic acid, 1-aminonaphthalene-4-, 5-, 6- and 8-sulfonic acids, 2-aminonaphthalene-5,7-disulfonic acid, 2-aminonaphthalene-7-sulfonic acid, 2-aminonaphthalene-1-sulfonic acid, p-phenylenediamine, 2-aminonaphthalene-1,5-disulfonic acid, 3,3'-dichlorobenzidine, benzidine-3,3'-disulfonic acid, 2,2'-dichloro-3,3'-dimethoxy-4,4'-diaminodiphenyl, 4-aminopyridine, 2-aminopyridine-N-oxide, 3-aminopyridine, 2-aminobenzothiazole, 4-, 5- or 6-aminoquinoline.

The coupling components which can be used with the aforementioned diazo components to make azo dyes of this invention may have the methylolatable linkage or a precursor; or else may be used with diazo components which have such linkages. Alternatively, as stated above, the methylolatable linkage may be hooked into an existing azo dye formed from components, neither of which have methylolatable linkages.

Examples of the methylolatable compounds which may be used as the coupling components are:

3,3-(phenylimino)bis-propionamide,
3,3'-{[2-(N-ethyl-m-toluidino)ethyl]imino}bis-propionamide,
3,3'-[(6-amino-2-naphthyl)sulfonylimino]dipropionamide,
3,3'-[(5-hydroxy-1-naphthyl)sulfonylimino]dipropionamide,
3,3'-[p-(5-hydroxy-3-methyl-1-pyrazoyl)phenylsulfonylimino]dipropionamide,
8-{{6-{m-[bis(2-carbamoylethyl)sulfamoyl]anilino}-4-hydroxy-s-triazine-2-yl}amino}-1-naphthol-3,6-disulfonic acid,
N,N-bis(2-carbamoylethyl)-p-(5-hydroxy-3-methyl-1-pyrazolyl)benzamide,
N,N-bis(2-carbamoylethyl)-5-hydroxy-1-naphthamide and
6-amino-N,N-bis(2-carbamoylethyl)-2-naphthamide.

Examples of the non-methylolatable compounds which may be used and the coupling components are, aniline, o- and m-toluidine, 2,5-xylidine, o-anisidine, m-anisidine, 2-methoxy-5-methylaniline,
2,5-dimethoxyaniline,
N-methylaniline,
N-methyl-o-toluidine,
N-methyl-m-toluidine,
N-ethyl-o-toluidine,
N-methyl-2-methoxy-5-methylaniline,
N-ethyl-2-methoxy-5-methylaniline,
N-methyl-m-anisidine,
1,3-dihydroxybenzene,
1-amino-8-naphthol-6-sulfonic acid,
1-amino or 1-benzamido-8-naphthol-3,6-disulfonic acid,
1-amino-8-naphthol-4,6-disulfonic acid,
1-methylamino-8-naphthol-6-sulfonic acid,
2- or 3-amino-5-naphthol-7-sulfonic acid,
3-acetamido- or 3-benzamido-5-naphthol-7-sulfonic acid,
2-methylamino-5-naphthol-7-sulfonic acid,
1-amino-8-naphthol-2,4-disulfonic acid,
1-amino-8-naphthol-4-sulfonic acid,
2-amino-naphthalene-6-sulfonic acid,
2-amino-naphthalene-3,6-disulfonic acid,
3-methyl-5-pyrazolone,
1-phenyl-3-methyl-5-pyrazolone,
1-(4-sulfophenyl)-3-methyl-5-pyrazolone,
1-(4-chlorophenyl)-3-methyl-5-pyrazolone,
1-phenyl-3-carboxy-5-pyrazolone,
1-phenyl-3-carbethoxy-5-pyrazolone,
aceto acetanilide,
4'-sulfo-acetoacetanilide,
bis-acetoacetbenzidide,
bis-acetoacettolidide,
acetoacettolidide,
m- and p-aminoacetanilide,
m- and p-amino-N-methylacetanilide,
1-naphthol-5- and 6-sulfonic acids,
1-naphthol-3,6-disulfonic acid,
1,8-dihydroxynaphthalene-3,6-disulfonic acid,
3-hydroxy-2-naphthamide,
3-carbamoyl-2-naphthol-1,6-disulfonic acid,
N-[2-aminoethyl]N-ethyl-m-toluidine, β-hydroxynaphthoic acid, arylides of various naphthoic acids such as 2-hydroxy-3-naphthanilide, 2-hydroxynaphthoyltoluidine and the like. Many other coupling components and diazo components are known and can be used. For obtaining the preferred azo dye residues, the coupling and/or the diazo component should have a solubilizing group.

A particularly preferred class of azo dyes residues are monoazos having from one to three sulfonic acid groups.

The various anthraquinone and other polyquinoid structures which are known collectively under the generic term of "vat dyes," are useful herein. Vat dyes moieties with solubilizing groups, e.g., free sulfonic or carboxylic acid substituents, are preferred.

Examples of the anthraquinone compounds which may be used to form the dyes of this invention are:

1-amino-4-(4'-aminoanilino)-anthraquinone-2,3'-disulfonic acid,
1-methylamino-4-(4'-aminoanilino)-anthraquinone-2,3'-disulfonic acid, and its 2-sulfo derivative,
1-amino-4-(4'-aminoanilino)-anthraquinone-6,3'-disulfonic acid,
1-amino-4-(4'-aminoanilino)-anthraquinone-2,3',5'-trisulfonic acid,
1-methylamino-4-(4'-aminoanilino)-anthraquinone-6-sulfonic acid,
1-methyl-amino-4-(4'-aminoanilino)-anthraquinone-6,3'-disulfonic acid,
1-cyclohexylamino-4-(4'-aminoanilino)-6-sulfonic acid,
1-methylamino-4-(3'-aminoanilino)-anthraquinone-6-sulfonic acid,
1-amino-4-(3'-aminoanilino)-anthraquinone-2,5-disulfonic acid,
1-amino-4-(4'-[4''-aminophenylazo]anilino)-anthraquinone-2,5,2''-trisulfonic acid,
1-amino-4-(4'-[4''-aminophenyl]-anilino)-anthraquinone-2,5,3''-trisulfonic acid,
1-amino-4-(4'-aminoanilino)-anthraquinone-3'-sulfonic acid,
1-amino-4-(3'-aminoanilino)-anthraquinone-4'-sulfonic acid,
1-amino-4-(4'-aminoanilino)-anthraquinone-2-sulfonic acid,
1-amino-4-(3'-amino-4'-methylanilino)-anthraquinone-2-sulfonic acid,
1-amino-4-(4'-amino-3'-methylanilino)-anthraquinone-2-sulfonic acid,
1-amino-4-(3'-amino-4',6'-dimethylanilino)-anthraquinone-2-sulfonic acid,
1-amino-4-(4'-aminoanilino)-anthraquinone-3'-sulfonic acid diethylamide,
1-amino-4-bromoanthraquinone-2-sulfonic acid,
1-amino-4-bromoanthraquinone-2,5-disulfonic acid,
1-amino-4-bromoanthraquinone-2,6-disulfonic acid,
1-amino-4-bromoanthraquinone-2,7-disulfonic acid and
1-amino-2,4-dibromoanthraquinone.

Of these, a preferred class may be represented by the formula:

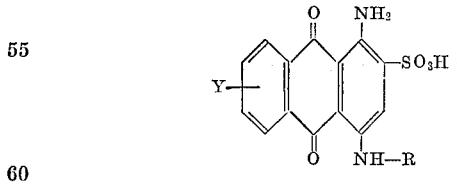

wherein Y is hydrogen or sulfonic acid; and R represents an aryl radical which may be further substituted, especially with solubilizing groups such as sulfo or carboxyl radicals.

The anthrone class of dyestuffs is derived from the anthraquinone class by cyclization in the 1,9-position. These dyes form a highly specialized class in themselves noted for their shade range of orange to red and their generally good light fastness. Many substituted anthrone dyes may be used as starting materials in this invention. These may be, for example, the following: pyrazolanthrones, such as 3,3'-disulfo-5-(4'-aminoanilino)pyrazolanthrone, and 2-methyl-4',8-disulfo-5-(3'-aminoanilino)pyrazolanthrone; anthrapyridimides, such as 4,3'-disulfo-6-(4'-aminoanilino)anthrapyrimidines; anthrapyrimidones, such as 3-methyl-4,4'-disulfo - 6 - (3' - aminoanilino)anthrapyridimidone and 3 - ethyl - 8,3' - disulfo - 6 - (4'-aminoanilino)-anthrapyrimidone; and anthrapyridazones, such as 2-(4'-sulfophenyl) - 6 - (4" - sulfo - 3" - aminoanilino) anthrapyridazones.

The phthalocyanine moiety is a highly stable and highly colored chemical structure. Various amino-substituted phthalocyanines, including many which are sulfonated or carboxylated or otherwise substituted by an acid grouping, can be used herein. Amino groups may be directly on the phthalocyanine rings or they may be in a side chain, such as an aminomethyl group. Such products can be prepared from phthalocyanine itself by treatment with methylolphthalimide and sulfuric acid as described in U.S. Patent No. 2,761,868. Copper phthalocyanine may be chlorosulfonated at elevated temperatures in the presence of thionyl chloride to provide up to four sulfonyl chloride groups. One or two sulfonyl chloride groups may be reacted under weakly acid conditions with imino-bis-propionamide or with 2-, 3-, or 4-amino-N,N-di(carbamoylethyl)benzenesulfonamide or the corresponding benzamides. These give dyes which, with methylolation, alkoxymethylolation or acyloxymethylolation, become the fiber reactive dyes of this invention. Also, phthalocyanine carboxylic acids can be aminomethylated in the same manner. Similarly, the nuclear substituted phthalocyanines, such as those containing one to four chlorines, can be sulfonated and aminomethylated. The total number of substituents on one phthalocyanine molecule should not exceed nine. The phthalocyanines are used either as metal-free phthalocyanines or in the form of their copper, cobalt, nickel or other metal complexes. The copper phthalocyamine residues containing two or three sulfo groups are preferred.

The dyes of the present invention differ from known dyes in the respect that one or two hydrogens of a known dye molecule are replaced by the radical:

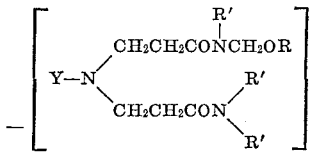

wherein R, R' and Y are as defined above.

The methylolatable linkage, viz:

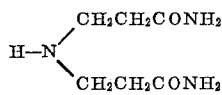

or the precursor linkage:

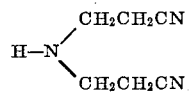

may be hooked into any of the foregoing components by reaction of iminobispropionamide or iminobispropionitrile with dye precursors or dyes having radicals such as an acylhalide (e.g., halosulfonyl, halocarbonyl or halotriazinyl) or reactive halogen.

The dyes of the present invention are prepared by several alternative routes which involve attaching an iminobispropionitrile or iminobispropionamide function to the dye moiety or a part thereof. In the case wherein an iminobispropionitrile function is attached, the nitrile radicals are subsequently hydrolyzed to amido radicals. The final step consists in reacting the amido functions with formaldehyde or a formaldehyde releasing agent so as to introduce at least one methylol group on the amido function. The first step in the over-all preparation is the reaction of iminobispropionitrile or iminobispropionamide (or the sulfate salt thereof) with a dye or dye precursor or intermediate which contains an acylating or alkylating group, thereby substituting the iminobispropionitrile or imino- bispropionamide function. Examples of such alkylating or acylating groups are: chlorosulfonyl, chlorocarbonyl, carboxylic acid anhydride, halomethylaryl, activated haloaryl (e.g., o- or p-nitrohaloaryl), activated vinyl (e.g., vinylarylsulfone), mono- and dihalo-s-triazinyl, etc.

This reaction can be conducted under conventional conditions, e.g., in an aqueous or non-aqueous medium in the presence of an acid binder such as an alkali carbonate, alkali hydroxide or tertiary organic amine. It is not necessary that the acylating or alkylating group be a complete dye molecule; it can be supplied by a part of a dye moiety, e.g., a coupling or diazonium component useful for the preparation of azo dyes or a mono- or dihalo triazinyl structure. Alternatively, the iminobispropionitrile or iminobispropionamide residue can be introduced into a dye or dye precursor by direct cyanoethylation or carbamoylethylation provided that said dye or dye procursor contains an amino function capable of being cyanoethylated or carbamoylethylated. Examples of such functional groups are: sulfamoyl, carbamoyl and amino. A preferred method carbamoylethylation which employs acrylamide is the subject of a copending application, Ser. No. 592,757, filed Nov. 8, 1966.

When a bispropionitrile results from the foregoing reactions, it is then hydrolyzed to convert the cyano groups to amido groups. Hydrolysis is accomplished in an aqueous medium in the presence of an acid such as sulfuric acid and at ambient temperatures or by an alkaline hydrogen peroxide treatment. If preferred, the hydrolysis step can be preceded by such other steps as are necessary for converting a coupling or diazo component into an azo dye.

The iminobis(propionamide) intermediates obtained from the hydrolysis reaction are readily converted to the final dyes of the present invention by treatment with at least two moles of formaldehyde and, preferably, an excess, at temperatures in the range of 20–90° C. and, preferably, in the range of 20–65° C. at pH above neutrality, e.g., pH 7.2 to about 10 until methylolation is complete. Glyoxal or paraformaldehyde may be used in place of formaldehyde. Methylol groups can be converted to alkoxymethyl groups by treatment with an alkanol in a strong acid medium.

If formaldehyde, glyoxal or paraformaldehyde is used in the presence of an organic acid such as acetic or sulfoacetic acid, acyloxymethyl groups become attached to the terminal carboxamide groups. Concentrations of 10 to 100% acetic acid have been found effective in acetylating the methylol group.

With proper selection of solvents, the above synthetic procedures may be equally successfully applied to the synthesis of dyes which do not contain water-solubilizing groups. The resulting dyes are applicable by standard dyeing procedures to silk, nylon and wool, giving shades with superior fastness properties.

Compounds of this invention, as stated before, are especially useful for dying polymeric materials characterized by having reactive hydrogens. They show exceptionally high color yield when properly applied and can be applied either alone or simultaneously with textile-improving agents to impart both color and wrinkle-recovery in one step.

Among the polymeric materials which are very suitably treated with the dyes of the present invention are cellulosics such as rayon and cotton, superpolyamides such as nylon, natural proteinaceous materials such as wool, silk, casein, zein and hair, and synthetic resins such as the phenolics.

The method by which the dyes of the present invention are applied follows conventional techniques for the use of known methylolated dyes. The dye is dissolved in an aqueous medium with an acid catalyst and the fabric or fiber is immersed therein. After a suitable period of immersion, the fabric of fiber is removed, dried, and then cured by heating to fix the dye to the substrate. Several suitable application techniques will be illustrated in the following examples.

The present invention is illustrated in the following examples.

EXAMPLE 1

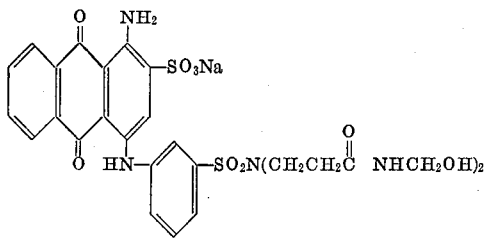

(A) m-Nitro-N,N-bis(2-cyanoethyl)benzenesulfonamide

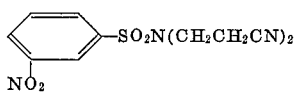

While maintaining the temperature at 15–20° C., there is added to 50 ml. of stirred pyridine 10.0 g. (0.045 M) of m-nitrobenzenesulfonyl chloride, followed by 5.6 g. (0.045 M) of 3,3′-iminodipropionitrile. The solution is then warmed at 50° C. for two hours. Its volume is decreased under reduced pressure until precipitation begins to occur and finally is poured into 400 ml. of well-stirred ice-water mixture. The precipitate is collected by filtration, washed with 1.5 liters of ice-water and dried in vacuo at ambient temperatures to yield 13.1 g. (94% of theory) of m-nitro - N,N - bis(2-cyanoethyl)benzenesulfonamide, M.P. 137–138° C.

(B) 3,3′-[(m-nitrobenzenesulfonyl)imino] bispropionamide

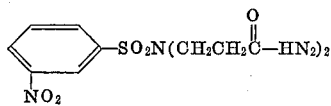

To 250 ml. of stirred concentrated sulfuric acid, at temperatures less than 20° C. is added in portions 77.8 g. (0.253 M) of m-nitro-N,N-bis(2-cyanoethyl)benzenesulfonamide. After completion of addition, the solution is stirred at ambient temperatures for five hours, poured onto 2 liters of well-stirred ice-water mixture, filtered, and the filtrated adjusted to pH 8 by addition of concentrated amonium hydroxide at 15–20° C. The precipitate is collected by filtration, washed with 500 ml. of water and air-dried to yield 75.5 g. (87% theory) of 3,3′-[(m-nitrobenzenesulfonyl)imino]bispropionamide, pale beige powder, M.P. 199–200° C.

(C) 3,3′-metanilyliminobispropionamide

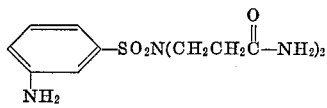

A well-stirred mixture of 600 ml. of water, 58.1 g. (1.04 M) of iron powder and 12 ml. of glacial acetic acid is warmed to 70° C. and there is then added in portions 131.1 g. (0.38 M) of 3,3′-[M-nitrobenzenesulfonyl) imino]bispropionamide. The temperature at the end of the addition is 90° C. and the mixture is then stirred an additional forty-five minutes at 90–95° C. The mixture is cooled to 75° C. and there is added 250 ml. of hot ethanol followed by sufficient solid sodium carbonate to precipitate soluble iron salts. Activated charcoal is added and the warm mixture is filtered through diatomaceous earth and the filtrate cooled for one hour at 0–5° C. The resulting precipitate is collected by filtration, washed with 500 ml. of ice-water and dried in vacuo at 55° C. to yield 106.6 g. (89% of theory) of 3,3′-metanilyliminobispropionamide, very pale tan crystals, M.P. 182–183.5° C.

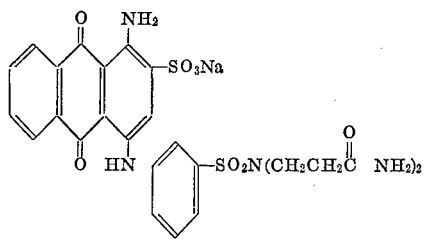

To 200 ml. of water is added 1.98 g. of cuprous chloride, 16.88 g. (0.30 mole) of sodium bicarbonate, 29.58 g. (0.056 mole) of 93.4% sodium 1-amino-4-bromoanthraquinone-2-sulfonate and 28.30 g. (0.09 mole) of 3,3′-metanilyliminobispropionamide. The mixture is stirred slowly and warmed to 80° C. over one hour. After one hour at 80° C., 100 ml. of water is added. It is stirred two hours at 79–81° C. When the reaction is complete, the product is filtered hot, washed with 400 ml. of water at 50° C. The wet-cake is reslurried in 2.5 liters of water at 87° C., 20 ml. of ammonium hydroxide is added and the whole heated to 95° C. To the resultant solution is added 30 g. of salt to precipitate the dye product. The product is isolated and washed with water. It is then redissolved in 2.5 liters of water at 95° C. and 20 ml. of ammonium hydroxide is added. To the solution is added gradually, 30 g. of salt, and the whole stirred to room temperature and filtered. The wet cake is reslurried in acetone, sucked dry and dried in a vacuum oven at 55° C. (Yield 21.40 g. of dark blue solid.)

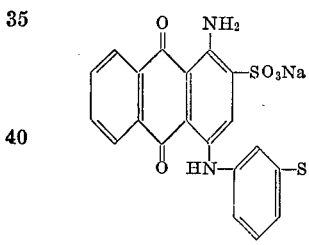

Methylolation.—Two grams of the product of Part D is dissolved in 10 ml. of water by adding 5 N sodium hydroxide to a pH of 9.5. To this is added with stirring, 15 ml. of 37% formaldehyde solution which has been pre-buffered to pH 9.5. The whole is stirred, heated six hours at pH 9.5 at a temperature of 60–62° C. and then drowned in 500 ml. of isopropanol. The product is isolated by filtration, washed with acetone and dried under vacuum at room temperature. Yield 2.30 g. of dark blue product.

When pad-dyed on cotton in 1.5% shade, using the procedure outlined hereinafter, with 20% on weight of dye (OWD) magnesium chloride as acid catalyst, at a pH of 4, a red-blue hue is obtained. The shade is very fast to wet pressing, washing and perspiration. Fixation of the dye on the cotton is about 75%.

EXAMPLE 1A

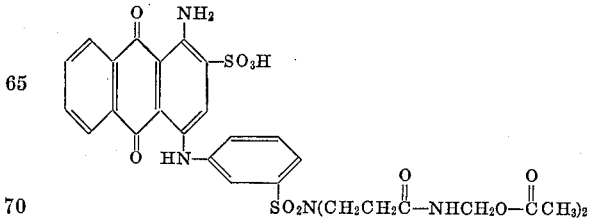

A 6.0 g. (0.009 M) portion of the dye obtained in Example 1, Part D, is heated for 0.5 hour with stirring in an aqueous medium containing 25% glacial acetic acid (by volume) and 23% (by volume) of a 37% aqueous formaldehyde solution. The mixture is cooled to room temperature, poured into 2.5 l. stirring isopropyl alcohol, filtered and the residue washed with 500 ml. isopropyl alcohol. After drying in vacuo, there is obtained 5.0 g. of a blue dye. When applied to cotton with a $NH_4Cl$ catalyst according to the pad dyeing procedure, it gives a bright red-shade blue dyeing in 85% fixation.

EXAMPLE 1B

In the aforementional procedure of Example 1D, in place of 3,3'-metanilyliminobispropionamide, if an equal amount of 3,3'-sulfanilyliminobispropionamide is used, which is the para isomer, a corresponding anthraquinone dye is obtained in which the sulfonyliminobispropionamide group is attached in the p-position of the anthraquinone's 4-anilino group. This is methylolated using the procedure of Example 1, Part E.

When pad-dyed on cotton in 3% shade using the following pad dyeing procedure, with 4 g. per liter ammonium chloride as catalyst, in the pad bath and a pH of 5, a red-blue hue is obtained on cotton. The shade is very fast to wet pressing, washing and perspiration. Fixation of the dye on the cotton is about 80%.

A dye analogous in dyeing properties to the above but with slightly improved solubility is prepared in a similar manner to the above except in Example 1D one starts with the disodium 1-amino-4-bromoanthraquinone-2,6-disulfonate.

EXAMPLE 1C

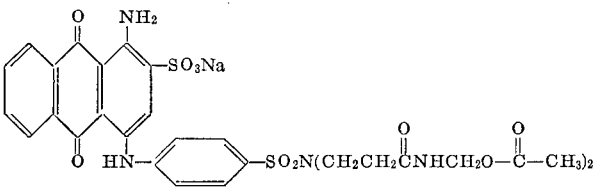

A mixture of 31.5 g. of the free carboxamide dye of Example 1B before methylolation, 85 ml. 37% formaldehyde, 215 ml. water and 100 ml. glacial acetic acid is heated at 85° C. for 1.5 hours and drowned in 4.5 l. isopropanol. The product is filtered, washed with isopropanol and dried at 40° C. to give 25.00 g. acetylmethylolated dye. It is soluble in dimethylformamide.

When padded in 3% shade on cotton OWF 5 g. per liter of ammonium chloride, dried and then cured at 350° F. for 1½ minute, a strong bright red-blue is obtained with 85% fixation of the dye on the cotton.

PAD-DYEING PROCEDURE

A 1.5% shade "on the weight of the fabric" ("OWF"), is achieved by using 0.75 g. dye per 50 ml. water. A 2% shade OWF is achieved by using 1 g. per 50 ml. water. A 3% shade OWF is achieved by using 1.5 g. per 50 ml. water.

The dye is pasted with water until in solution. It is made up to 50 ml. and the pH adjusted to 4–7 by the addition of an acid, usually hydrochloric acid.

An acid catalyst such as one of the following:

(a) magnesium chloride
(b) ammonium chloride
(c) ammonium sulfate
(d) ammonium gluconate
(e) triethanolamine hydrochloride is added. The amount of catalyst used may vary from 0.25 to 10 grams per liter of pad bath. One to four grams per liter gives a good test result. Or the catalyst may be figured on the weight of the dye "OWD" such as 10 to 20% OWD.

The dye solution is padded onto 80 square cotton using one dip and one nip. The padded cotton is dried.

The dry padded cotton is given a thermal cure at 300–375° F. for 5 minutes to 45 seconds, and preferably at 350° F. for 1½ minutes. It is soaped (five minutes) at the boil, rinsed and dried.

The amount of dye fixed to the fiber is quantitatively determined by one of two methods:

(1) Comparison of the spectrophotometric reflectance curve of the dyed cotton before and after soaping.

(2) Extraction of the dye from the fabric by dissolving the dyed fabric in concentrated sulfuric acid, diluting with ice water and measurement of spectrophotometric transmission of the solution.

A comparison of the curves of the dyed cotton before and after soaping is expressed in percent of fixation of the dye to the cotton.

EXAMPLE 2

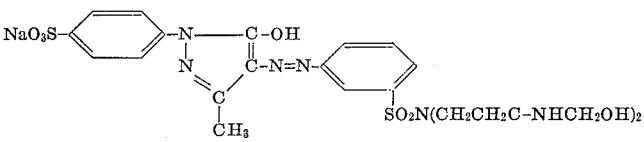

(A) The cold, aqueous diazonium solution derived from 15.72 g. (0.05 M) of 3,3'-metanilyliminobispropionamide, is stirred into a solution of 12.72 g. (0.05 M) of 3-methyl-1-p-sulfophenylpyrazolin-5-one, in 300 ml. of water containing 20.8 g. (0.2 M) of sodium carbonate. The reaction is stirred at ambient temperatures for two hours, the pH adjusted to 6.9 with dilute hydrochloric acid, warmed to 50° C., clean salt is added with stirring to precipitate the dye, and the slurry is cooled to 5° C. in an ice-water bath. The product is collected by filtration, washed with three 50 ml. portions of 15% brine solution, followed by 10 ml. of water and dried in vacuo at 55° C. to yield 32.0 g. of orange dye assaying 80% (85% of theory yield).

(B) A solution of 12.03 g. of the above dye in 100 ml. water is adjusted to pH 9.5 and there is added 32.43 g. of 37% aqueous formaldehyde, the pH of which is first adjusted to 9.5. The mixture is stirred at 65° C. for six hours while maintaining a pH of 9.5, cooled and poured into 2.0 liters of well-stirred isopropyl alcohol. The precipitate is collected by filtration, washed with 500 ml. of isopropyl alcohol followed by 700 ml. of ethyl ether, and dried in vacuo at ambient temperatures to yield 12.24 g. of yellow dye.

Pad-dyed onto cotton in a 1.5% shade, using 20% magnesium chloride OWD, a bright green yellow is obtained. At pH 6.1 fixation is 90%; at pH 4.0 fixation is 95%. Both have excellent fastness to wet pressing, washing and perspiration.

(C) Acetylmethylolation.—To obtain the bisacetoxymethyl dye, 18.62 g. dye A above is heated at 85° C. with 32.6 g. formaldehyde in 100 ml. glacial acetic acid until the reaction is complete. The solution is clarified, poured into 500 ml. isopropanol and the product isolated. Yield is 4.93 g. dye. Padded in 3% shade on cotton from a bath containing 4 g./l. ammonium chloride, dried, cured 350° F. for 1½" a bright green-yellow of 90% fixation is obtained of excellent fastness to wet pressing.

EXAMPLE 3

Preparation of the p-isomer of the Fiber Reactive Dye of Example 2

(A) Coupling.—The diazo solution is prepared by adding to 113 ml. water, 15.7 g. 3,3'-sulfanilyliminobispropionamide ("4ACBS") 25 ml. 5 N hydrochloric acid, stirring to solution adjusting to 0° C. with 40 g. ice and adding 14.1 g. 25% sodium nitrite solution. This diazo solution is added to a solution of 34.7 g., 34.8% 1-(4'-sulfophenyl)-3-methyl-5-pyrazolone paste in a mixture of 88 ml. water; 10 ml. 5 N sodium hydroxide solution and 20 g. sodium acetate is added. When coupling is complete, the dye is precipitated by gradual addition of 20 ml. 5 N HCl and slowly salting with 65 g. sodium chloride. The dye is isolated and dried to give 35.5 g. product.

(B) Methylolation.—To 100 ml. water is added 17.7 g. product A heated to 65° C. and 3.8 g. paraformaldehyde. The pH is adjusted to 9.0–9.5. The solution is stirred until methylolation is complete and then evaporated. Yield is 19.1 g. methylolated dye.

When padded on cotton in 3% OWF by the pad dyeing procedure using ammonium chloride as catalyst dried and cured, fixation is 85%. A bright green yellow is obtained similar in color and fastness to the meta isomer of Example 2.

If in the above procedure A, instead of the pyrazolone recited, 22.6 g. 71.6% 1-(2,5-dichloro-4'-sulfophenyl)-3-methyl-5-pyrazolone is used and the procedures of A and B carried out, 14.6 g. methylolated product is obtained.

A 1.5 g. sample of the methylolated product is dissolved in 48 ml. water and the pH adjusted to 7 with dilute hydrochloric acid. Ammonium chloride, 2 ml. 10% solution, is added. It is padded on 80² cotton, air dried, cured 1.5 minutes at 350° F. soaped 5 minutes at the boil, rinsed and pressed dry. A bright green yellow of 90% fixation is obtained. The shade is fast to washing, to perspiration and to the color transference wet test. It is fair to good for crocking and is non-phototropic.

EXAMPLE 4

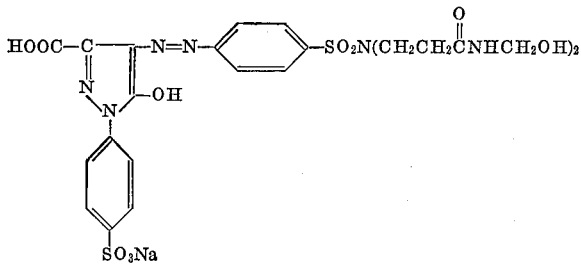

To 15.0 g. dyestuff prepared by coupling diazotized 4ACBS to 1-phenyl-3-carboethoxy-5-pyrazolone in 200 ml. water, adjusted to and maintained at pH 9.5, by dilute caustic soda, is added 60 ml. 37% formaldehyde. The whole is heated at 65° C. for four hours. Hydrolysis of the ester group takes place as well as methylolation. It is isolated by cooling to ambient temperature, drowned in three liters of isopropanol, filtered and dried. Yield is 9.5 g.

When padded on cotton in 3% shade OWF using 4 g. per liter ammonium chloride as catalyst, dried and cured at 350° F. for 1½ minutes, 80% fixation of dye is obtained. The shade is bright reddish yellow and has excellent fastness to wet pressing and perspiration.

EXAMPLE 5

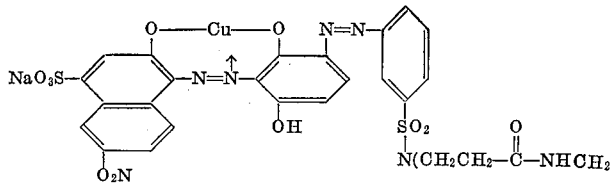

To a mixture of one liter of water and 320 ml. 5 N HCl is added 125.6 g. (0.4) 3ACBS. Ice is added and a solution of 28.8 g. (0.44 mole) sodium nitrite. When diazotization is complete, excess nitrate is removed with sulfamic acid. The diazonium salt is added slowly to a mixture of 88 g. (0.8 mole) resorcinol 84.8 g. (0.8 mole) sodium carbonate and 500 ml. water. When coupling is complete, the dye is isolated, slurried in one liter of acetone, filtered and dried.

To a solution containing 0.51 mole of diazotized 1-amino - 2-hydroxy-6-nitronaphthalene-4-sulfonic acid, 75 ml. water and 10 g. sodium carbonate, is added 21.8 g. (0.05 mole) of the above dye. When coupling is complete the mixture is diluted to 250 ml. volume with water and 20 g. sodium chloride added. The temperature is adjusted to 50° C. and the pH to 7.5 with dilute hydrochloric acid. The slurry is cooled to ambient temperature and the dye isolated and dried.

The dye is copperized by dissolving 21.2 g. (0.03 mole) in 250 ml. water, adding 4.92 g. (0.06 mole) anhydrous sodium acetate and heating to 65° C.; 7.5 g. (0.03 mole) copper sulfate pentahydrate is added and heating continued at 80–85° C. for 1.5 hours. The pH is adjusted to 7.5 with dilute caustic soda. It is cooled and filtered. The product is dissolved in 200 ml. hot dimethylformamide, drowned in 2 liters isopropanol, filtered and dried.

The copperized dye is methylolated by dissolving 7.69 g. (0.01 mole) of the product in 75 ml. water, adding 16.2 g. 37% formaldehyde, adjusting the pH to 7.5 and heating six hours at 65° C. The product is drowned in 2 liters isopropanol, filtered and dried.

When 3% OWF is padded on cotton from a pad bath containing 4 g. per liter ammonium chloride, dried and cured at 350° F. for 1½ minute, an attractive brown hue of excellent light-fastness (5+) is obtained. Fixation is 95%.

EXAMPLE 6

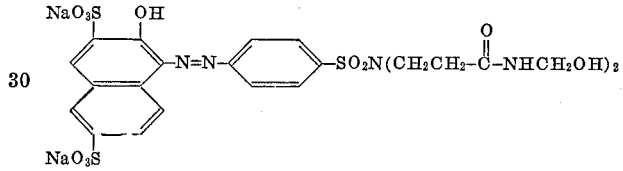

The diazo component, 15.7 g. 4-amino-N,N-(2-carbamoylethyl)benzenesulfonamide is mixed with 25.0 ml. 5 N hydrochloric acid and 100 ml. water and cooled to 0° C. with 70 g. ice. It is diazotized with 14.0 g. 25% sodium nitrite solution. When diazotization is complete, excess nitrite is removed with sulfamic acid.

The solution of diazo is added to a solution prepared by adding 17.4 g. sodium 2-hydroxynaphthalene-3,6-disulfonate to a mixture of 200 ml. water and 12.6 g. sodium bicarbonate and cooling with 50 g. ice. When coupling is complete, the whole is heated to 60° C. salted and washed with 2% brine solution. The dye is isolated and without drying, slurried in water sufficient to make a 15% dye slurry. The slurry is heated to 65° C. with stirring and 7.0 g. paraformaldehyde added. The pH is adjusted to 9.5 with dilute sodium hydroxide solution and stirred at 65° C. and pH 9.5 until methylolation is complete. The pH is then adjusted to 7.0 with dilute hydrochloric acid, cooled to 35° C. clarifed and spray dried. Yield is 37.5 g. of methylolated dye.

A blend of 9.0 g. dye, 0.63 g. sodium xylenesulfonate and 2.7 g. dextrose is prepared. 1.5 g. blend is dissolved in 48 ml. water and 2 ml. of 10% ammonium chloride solution. It is padded on 80² cotton, air-dried and cured 1½ minute at 350° F. The dyeing is soaped 5 minutes at the boil in 0.2% soap solution, rinsed and pressed dry. It dyes cotton full bright reddish orange shades in 85% fixation. It is fast to washing, perspiration and wet pressing.

EXAMPLE 7

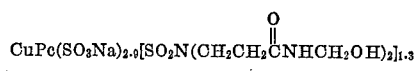

(A) To 280 ml. chlorosulfonic acid is added 47.6 g. (0.08 mole) 96% copper phthalocyanine ("CuPc") with cooling and stirring. The mixture is heated at 135° C. for three hours. It is then cooled to 70° C. and 36 ml. thionyl chloride added dropwise. It is heated at 95° C. three hours. It is cooled and poured into a mixture of 140 g. salt, 660 ml. water and 4500 g. ice. The product is isolated and used without drying in B.

(B) Half of the product prepared in B is added over 30 minutes to a mixture prepared in the following manner.

41.2 g. (0.16 mole) of iminobispropionamide sulfate, is suspended in 50 ml. water. The mixture is adjusted to pH 7.5 with about 20 g. sodium carbonate; 60 g. sodium bicarbonate is added. It is cooled to 0° C. and stirred vigorously while adding Product B.

The reaction mixture is stirred at 0–5° C. four hours and then stirred to ambient temperature. To it is added 20 g. salt. The product is filtered, slurried in one liter isopropanol, filtered and dried. The dry product is dissolved in 400 ml. dimethylformamide, filtered, drowned in three liters isopropanol, filtered and sucked dry to give 40 g. product.

(C) Twenty-five grams of Product B is dissolved in 185 ml. water; 40.5 g. 37% formaldehyde is added. The pH is adjusted to 8.5. The whole is heated six hours at pH 7.5–8.5 until methylolation is complete. At pH 7.5 the mixture is filtered, the product drowned in 2 liters isopropanol, filtered and sucked dry. Yield 25 g. methylolated product.

Product C is padded in 3% OWF on 80² cotton from a bath containing 4 g. per liter ammonium chloride, dried, cured at 350° F. 1½ minute to give a bright turquoise hue fast to wet pressing, dry crocking, washing and perspiration.

EXAMPLE 8

CuPc(SO₃Na)₂.₀[SO₂N(CH₂CH₂CNH₂CH₂OH)₂]₁.₆

(A) Chlorosulfonation of copper phthalocyanine.—A solution of 47.6 g. 96% copper phthalocyanine in 280 ml. chlorosulfonic acid is heated at 135° C. for three hours. The temperature is adjusted to 95° C.; 36 ml. thionyl chloride is added and the mixture heated at 95° C. for three hours. The reaction mixture is cooled to ambient temperature, poured over a mixture of 7 liters of ice and 40 g. sodium chloride and the product isolated.

(B) Reaction with iminobispropionamide ("IBP").— One fourth of the filter cake prepared above (0.02 mole) is added at 0° C. to a mixture of 10.28 g. (0.04 mole) iminobispropionamide sulfate in 25 ml. water, adjusted to pH 7 with 2 g. sodium carbonate; 0.3 g. sodium carbonate is added and the mixture iced to 0° C.

The whole is stirred at 5–10° C. for 1.5 hours, stirred to ambient temperature, isolated and dried. The product is precipitated from 400 ml. dimethylformamide by drowning in 3 l. isopropanol. The product is filtered and dried to yield 18.54 g.

(C) Methylolation of B.—A mixture of 10 g. Product B, 75 ml. water and 2 g. 37% formaldehyde adjusted to and maintained at 7.5–8 with dilute caustic soda, is heated at 65° C. until methylolation is complete, about six hours. The reaction is drowned in one liter of isopropanol. The suspension is digested with a few drops of hydrochloric acid. The product is filtered and dried. Yield is 9.11 g. having a formaldehyde content of 3.85%.

The methylolated Product C, when padded on cotton in 3% shade from bath containing 4 g./liter ammonium chloride, dried, cured at 1½ minute at 350° F., soaped, rinsed and dried, gives a bright turquoise shade on cotton. Fixation is 90%.

EXAMPLE 9

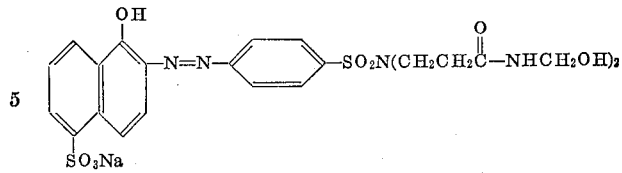

11.4 g. (0.02 mole) of the dye obtained by coupling diazotized 4ACBS to an alkaline solution (pH 9.0) of 5-hydroxynaphthalene-1-sulfonic acid, is methylolated in 50 ml. water at pH 9.5 with 32.4 ml. 37% formaldehyde at 65° C. for one hour. It is isolated by drowning in 500 ml. isopropanol, filtered, washed with isopropanol ethyl ether and dried under vacuum. The fiber reactive dye is padded on cotton in 3% shade OWF using 4 g. per liter ammonium chloride. It is dried and cured 1½ minute at 300° F. A bright scarlet shade is obtained with a fixation of more than 85%. Fastness to wet pressing is excellent. This dye is dischargeable. On printing 90% fixation is obtained.

EXAMPLE 10

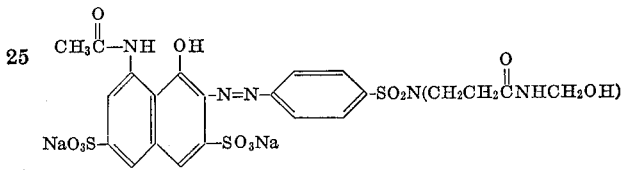

9.4 g. (0.03 mole) of p-amino-N,N-bis(2-carbamoylethyl)benzenesulfonamide is dissolved in a mixture of 100 ml. of water and 20 ml. of concentrated hydrochloric acid. The solution is chilled to 0° C. with ice, stirred, and a solution of 2.31 g. (.033) of sodium nitrite in 30 ml. of water, is added. It is stirred one-half hour, keeping it cold by periodic addition of ice. Excess nitrous acid is destroyed with sulfamic acid, giving 225 ml. of diazo solution.

9.58 g. (.03) of H-acid is dissolved in 100 ml. of water with 5 N sodium hydroxide. This solution is cooled with ice and 10 ml. of acetic anhydride is added. The solution is stirred one-half hour, 31.6 g. (0.3) of sodium carbonate is added. With stirring, the diazo from above is rapidly added, coupling instant. The solution is stirred one-half hour, warmed to 40° C. and 100 g. salt is added. The mixture is cooled to room temperature, filtered, washed with 15% brine in vacuum oven at 60° C., then at 100° C. 21 g. of dye is obtained.

20 g. of the above dye is mixed with 100 ml. of water, the pH of slurry is adjusted to 9.5, 33 g. of 37% formaldehyde solution is added, and the mixture is stirred for six hours at 65° C., keeping the pH at 9.3 to 9.5. 2000 ml. of isopropanol is added, the solution is filtered, and the solids washed with 300 ml. of isopropanol. The product is dried in a vacuum oven at room temperature.

Padded in 3% dye OWF using 4 g. per liter ammonium chloride, dried and cured 1½ minute at 350° F., soaped at the boil gives an attractive red shade. Fixation is 75%.

The m-isomer similarly prepared from 3,3'-metanilyl-iminobispropionamide gives a brownish-red hue on cotton.

The o-isomer similarly prepared from 3,3'-orthanilyl-iminobispropionamide gives a brownish red-orange hue on cotton.

If in the above procedure H-acid is benzoylated instead of acetylated, a blue-red of 80% fixation on cotton is obtained.

EXAMPLE 11

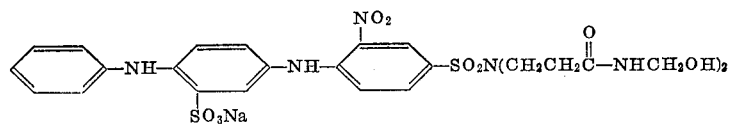

To a solution of 31.5 (0.11 M) of sodium 4-amino-diphenylamine-2-sulfonate in 500 ml. of water containing 16.4 g. (0.2 M) of sodium acetate, is added a solution of 37.9 g. (0.10 M) of 4-chloro-3-nitro-N,N-(2-carbamoylethyl)benzenesulfonamide in 75 ml. water and 100 ml. dioxane. The resulting partial solution is warmed to 90° C. over three hours, kept at 90° C. for one hour, cooled to 60° C. and filtered through diatomaceous earth. The filtrate is re-warmed to 60° C. and there is added sufficient sodium chloride to precipitate the product. The filtered product is washed with 200 ml. of 10% brine and dried in an atmospheric oven at 55° C. to yield 43.6 g. of a yellowish-brown powder.

A solution of 12.58 g. of the above powder in 150 ml. of water is adjusted to pH 9.5 and there is added a pH 9.5 solution of 32.43 g. of 37% aqueous formaldehyde. The solution is kept at pH 9.5 and 65° C. for six hours, cooled to 25° C., filtered through diatomaceous earth and the filtrate poured into 3 liters of well-stirred isopropyl alcohol. The precipitate is collected by filtration washed with 500 ml. of isopropyl alcohol and dried in vacuo at ambient temperature to yield 10.61 g. of yellow-brown powder.

The product dyes cotton a brownish-yellow hue of good fastness to wet pressing.

EXAMPLE 12

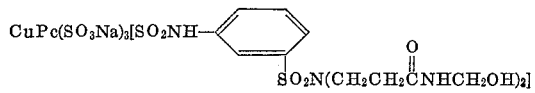

To 70 ml. of chlorosulfonic acid is added with stirring and cooling, so that the temperature does not exceed 30° C., 11.5 g. (0.02 M) of copper phthalocyanine and the reaction then heated to 135° C. and maintained at 135–137° C. for two hours, cooled, stirred at ambient temperatures for sixteen hours and poured into a well-stirred mixture of 165 ml. of water, 94 g. of sodium chloride and 150 g. of ice. The precipitate is collected by filtration and washed with 500 ml. of ice-water. The wet sulfonyl chloride is slurried with 100 g. of ice and 100 ml. of water and the pH adjusted to 6.5. There is then added all at once a cooled mixture of 19.25 g. (0.06 M) of 3,3'-metanilyliminobispropionamide in 100 ml. of acetone and 100 ml. of water. While maintaining a pH of 6.5 throughout, the reaction is stirred at ambient temperatures for 1.5 hours, and at 43° C. for one hour, and then sufficient sodium chloride is added to precipitate the dye. The precipitate is collected by filtration, washed with 100 ml. of saturated brine solution and dried in vacuo at ambient teperatures to yield 30.46 g. of green-blue dye. The crude dye is placed in 750 ml. of water, the pH adjusted to 7.5 and the solution warmed to 50° C., filtered through diatomaceous earth, and the filtrate poured into 2.0 liters of well-stirred isopropyl alcohol. The precipitate is collected by filtration, washed with a mixture of 200 ml. of water and 800 ml. of isopropyl alcohol followed by 250 ml. of isopropyl alcohol, and dried in vacuo at 55° C. to yield 19.37 g. of green-blue dye.

A solution of 18.26 g. of the above dye in 100 ml. of water is adjusted to pH 9.5 and there is then added a pH 9.5 solution of 97.29 g. of 37% aqueous formaldehyde. The reaction is stirred at 65° C. for six hours while maintaining a pH of 9.5, cooled and poured into 3.0 liters of well-stirred isopropyl alcohol. The precipitate is collected by filtration, washed with 500 ml. of isopropyl alcohol, followed by 400 ml. of ethyl ether and dried in vacuo at ambient temperatures to yield 18.91 g. of green-blue powder containing 5.06% combined formaldehyde.

A turquoise hue of excellent fastness to wet pressing is obtained by pad-dyeing the product in a 2% shade onto cotton. 90% fixation is obtained using 10% ammonium sulfate OWD as acid catalyst, and, a pH of 5.7.

If in place of 3,3'-metanilyliminobispropionamide, the same amount of 3,3'-sulfanilyliminobispropionamide is used, the fiber-reactive copper phthalocyanine dye is the p-isomer.

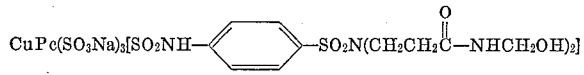

It dyes cotton turquoise of similar hue and fastness.

If an excess of thionyl chloride is added to the reaction mixture at the chlorosulfonation stage, the number of sulfonylaminophenyliminobispropionamide groups may be increased to two by using two moles of this intermediate. The CuPc will then have two sulfonate groups.

EXAMPLE 13

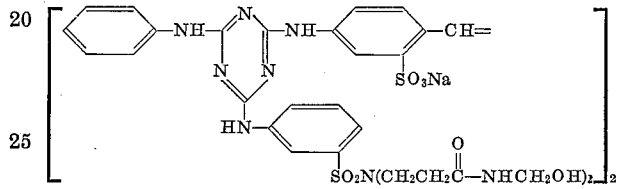

To a 0–5° C. solution of 7.85 g. (0.021 M) of 4,4'-diaminostilbene-2,2'-disulfonic acid in 75 ml. of water, 50 ml. of acetone and 8 ml. of 20% aqueous sodium hydroxide is added rapidly a solution of 7.85 g. (0.042 M) of cyanuric chloride in 70 ml. of acetone. After one-half hour, the pH is adjusted to 6.5 with NaOH, and there is added a slurry of 3.38 g. (0.042 M) of 3,3'-metanilyliminobispropionamide in 75 ml. of water and 50 ml. of acetone. During the addition, the pH is maintained at 6–7, and the temperature below 10° C. Over a period of one hour, the temperature is raised to 30° C., constantly maintaining a pH of 6.5. There is then added 4.37 g. (0.047 M) of aniline and the reaction is refluxed at 78° C. for two and one-half hours, cooled to 25° C. and the product collected by filtration, washed with 50 ml. of water and dried in an atmospheric oven at 55° C. to yield 28.3 g. of a yellow powder.

A pH 9.5 solution of 26.8 g. (0.02 M) of the above material in 150 ml. of water is treated with a pH 9.5 solution of 32.43 g. (0.4 M) of 37% aqueous formaldehyde, and the resulting mixture heated with stirring at 65° C. for six hours, maintaining the pH constantly at 9.5. The solution is cooled to 25° C., filtered through diatomaceous earth and the filtrate poured into 3.5 liters of well-stirred isopropyl alcohol. The precipitate is collected by filtration, washed with 1.5 liters of isopropyl alcohol, followed by 300 ml. of ether, and dried in vacuo at ambient temperature to yield 27.86 g. of a product which analyzes for 3.18% (1.74 methylol groups) formaldehyde.

This compound has high affinity for cotton, even at room temperature, and can be applied from a detergent bath of a nonionic or anionic detergent or by the pad-dyeing method. Under ultraviolet light, it gives off a blue fluorescence.

EXAMPLE 14

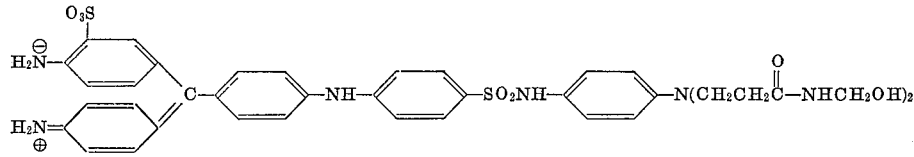

A slurry of 60.1 g. (0.1 M) of the hydrochloride salt of Alkali Blue monosulfonylchloride in 1 liter of ice and water is adjusted to pH 6.0 and there is added a 0–5° C. solution of 28.6 g. (0.1 M) of 3,3'-(p-aminophenylimine) bispropionamide hydrochloride in 100 ml. of water. The mixture is slowly warmed to 45° C., maintaining a pH of 6.0 kept at 45° C. for two hours, filtered through diatomaceous earth and the filtrate treated with sodium chloride at 50° C. The slurry is cooled to 25° C., filtered, and the residue washed with 200 ml. of 10% brine and dried at 55° C. to yield 61.3 g. of blue powder.

A solution of 16.30 g. of the above powder in 150 ml. of water is adjusted to pH 7.5 and there is then added 32.43 g. of pH 7.5 solution of 37% aqueous formaldehyde. The solution is maintained at ambient temperatures (25–30° C.) and pH 7.5 for 24 hours, filtered through diatomaceous earth and the filtrate pH carefully adjusted to 6.5. The filtrate is then poured into 3 liters of well-stirred isopropyl alcohol and the precipitate collected by filtration, washed with 500 ml. of isopropyl alcohol and dried in vacuo at ambient temperatures to yield 14.3 g. of dark blue powder.

When pad-dyed on cotton, red-blue shades are obtained of good fastness to wet pressing.

EXAMPLE 15

(A) Chlorosulfonation of nigrosine.—A mixture of 100 ml. chlorosulfonic acid and 12.5 g. Nigrosine SSB which is C.I. Solvent Black 5, Colour Index No. 50415, is heated at 140° C. for 2½ hours. It is cooled to ambient temperature; 4.4 ml. thionyl chloride is added. It is then heated at 90° C. for one hour, cooled to ambient temperature and poured into a mixture of 500 g. ice and 140 g. sodium chloride. The product is isolated as a wet-cake.

(B) Condensation with "3ACBS".—To 300 g. ice and 100 ml. water at about 0° C. is added the product wet cake prepared in "A." The pH is adjusted to 6.0 with 50% caustic soda solution. To this is added with stirring, 8.15 g. 3,3'-(metanilylimino)bispropionamide "3ACBS." The pH is kept 6.0 with 10% sodium carbonate solution. The whole is heated to 65° C., cooled to 50° C., salted, cooled further and filtered. The product, dry, yields 39 g. "B."

(C) Methylolation of Product B.—To 250 ml. water is added 39 g. Product B. The pH is adjusted to 9.5 with 5 N caustic soda solution and the whole heated slowly to 65° C. To it is added 50 ml. 37% formaldehyde solution. Methylolation is completed by heating 65° C. for 2½ hours with a pH 9.5. The product is isolated by cooling the mixture and drowning the whole in four liters isopropanol. The methylolated Product C is filtered, washed with isopropanol and dried; yield is 28.5 g. "C."

It is pad-dyed in 3% shade on cotton (OWF) using 4 g. per liter ammonium chloride in the pad bath. The padded fabric is dried, cured 1½ minutes at 350° F., soaped and rinsed. A deep gray hue in 85% fixation is obtained. The dyed cotton is fast to wet pressing, dry crocking and washing.

In the above procedure B, if 8.5 g. "3ACBS" is replaced by 7.5 g. 3,3'-iminobispropionamide sulfate ("IBP"), 43 g. product is obtained. Five grams of this product, on methylolation by procedure C using proportional amounts gives 4.2 g. methylolated dye. When pad-dyed as described above a deep gray hue with 90% dye-fixation on the cotton is obtained. It is likewise fast to wet pressing, dry crocking and washing.

EXAMPLE 16

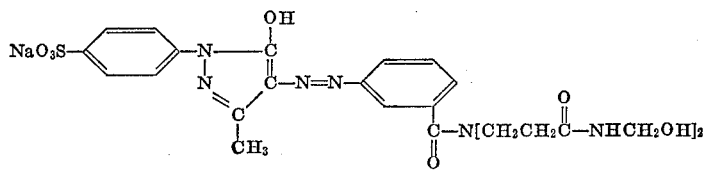

(A) m-Nitro-N,N-bis(2-cyanoethyl)benzamide

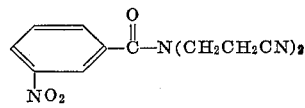

To a cooled solution of 61.60 g. (0.5 M) of 3,3'-iminodipropionitrile and 39.55 g. (0.5 M) of pyridine in 500 ml. of dioxane is added dropwise at a rate such that the temperature is 17–19° C., 92.8 g. (0.5 M) of m-nitrobenzoyl chloride in 100 ml. of dioxane. After completion of addition, the solution is stirred at ambient temperatures for one hour, and then at 50° C. for one-half hour. Activated charcoal is added, the warm solution filtered through a diatomaceous earth filter and the filtrate is poured into 2.5 liters of well-stirred ice and water. The precipitate is collected by filtration, washed with 1.0 liter of water and dried in a 65° C. atmospheric oven to yield 111.9 g. (81.9% of theory) of m-nitro-N,N-bis(2-cyanoethyl)benzamide, very pale beige crystals, M.P. 118–119.5° C.

(B) m-Nitro-N,N-bis(2-carbamoylethyl)benzamide

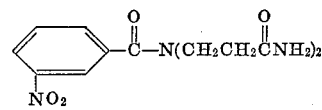

To 500 ml. of concentrated sulfuric acid at 0–5° C. is added with stirring 124.6 g. (0.456 M) of m-nitro-N,N-bis(2-cyanoethyl)benzamide. After completion of addition, the mixture is stirred at ambient temperatures for five hours, poured into 2 liters of well-stirred ice and water, and the murky solution filtered through a diatomaceous earth filter. The filtrate is adjusted to pH 7 by addition of concentrated ammonium hydroxide at 10–20° C., and the resulting precipitate collected by filtration, the cake washed with 3 liters of water and dried in vacuo at 45° C. to yield 111.5 g. (78.6% of theory) of m-nitro-N,N-bis(2-carbamoylethyl)benzamide, very pale beige crystals, M.P. 172.5–173.5° C.

(C) m-Amino-N,N-bis(2-carbamoylethyl)benzamide "3ACBA"

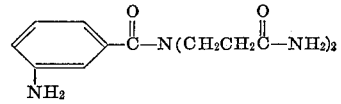

A stirred mixture of 500 ml. of water, 52.5 g. (0.94 M) of iron powder and 6 ml. of glacial acetic acid is warmed at 75° C. and there is then added in portions 104.8 g. (0.34 M) of m-nitro-N,N-bis(2-cyanoethyl)benzamide. The temperature is allowed to rise to 90° C. during the addition, and the mixture maintained at 90–95° C. for fifteen minutes after the addition is completed. The mixture is cooled to 70° C., sufficient solid sodium carbonate added to precipitate soluble iron salts, and the warm mixture filtered through diatomaceous earth. The filtrate is evaporated to dryness under reduced pressure at 40–45° C., the residue taken up in 300 ml. of hot ethanol containing activated charcoal and diatomaceous earth and the ethanol solution filtered hot. The filtrate is poured into 2 liters of well-stirred dioxane, and ethyl ether added to complete precipitation. The precipitate is collected by filtration, washed with one liter of ethyl ether and dried in vacuo at ambient temperatures to yield 97.3 g. of m - amino - N,N - bis(2 - carbamoylethyl)benzamide, pale beige crystals, decomposing with effervescence at 109° C. A portion, recrystallized from isopropyl alcohol, decomposes at 162° C. and analyzes for the sesquihydrate.

(D)

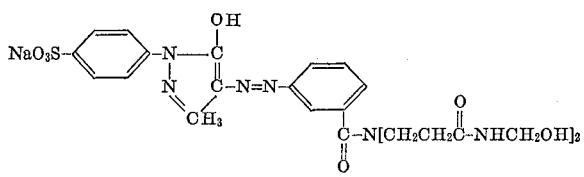

The cold, aqueous diazonium solution derived from 13.92 g. (0.05 M) of m-amino-N,N-bis(2-carbamoylethyl)benzamide, is stirred into a solution of 12.72 g. (0.05 M) of 3-methyl-1-p-sulfophenylpyrazolin-5-one in 300 ml. of water containing 20.8 g. (0.2 M) of sodium carbonate. The reaction is stirred at ambient temperatures for three hours, filtered, the filtrate warmed to 50° C., and the pH adjusted to 7.0 and sodium chloride is added with stirring to precipitate the dye. The mixture is cooled to 25° C., filtered, the cake washed with 100 ml. of 20% brine solution, followed by 100 ml. of 10% brine solution, and dried in vacuo at 50° C. to yield 40.4 g. of orange powder (89% of theory yield).

A solution of 32.31 g. of the above powder in 150 ml. of water is adjusted to pH 9.5 and there is added, after adjusting its pH to 9.5, 60 g. of 37% aqueous formaldehyde. The reaction is stirred at 65° C. for six hours, keeping the pH at 9.5, cooled, diluted with isopropyl alcohol to precipitate the dye, and the isopropyl alcohol then removed by decantation. The residue is titrated with ether, filtered, the cake washed with ether and dried in vacuo at ambient temperatures to yield 27.8 g. of yellow dye.

When pad-dyed on cotton, a bright green-yellow hue is obtained of excellent fastness to wet pressing, washing and acid perspiration. Using 20% magnesium chloride OWD, fixation is 85% at pH 4 and 80% at pH 6.5. It has good fastness to alkaline perspiration and dry crocking.

EXAMPLE 17

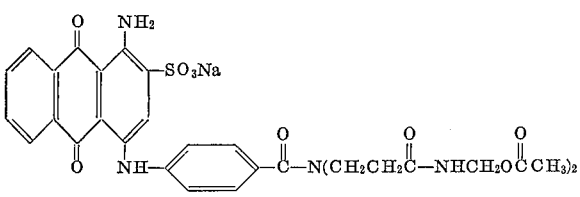

(A) p-Amino-N,N-bis(2-carbamoylethyl)benzamide ("4ACBA")

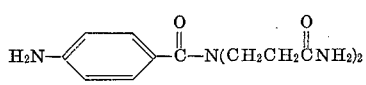

A solution of 25.7 g. iminobispropionamide sulfate prepared in a mixture of 300 ml. ice and water containing 16.8 g. sodium bicarbonate, is adjusted to pH 6.7; 20.36 g. p-nitrobenzoyl chloride in 100 ml. acetone is added over fifteen minutes. The pH is kept at 6.7. The product is filtered, washed with hot water and acetone. It is recrystallized from hot dimethylformamide, filtered, washed with acetone and dried. M.P. 243.5–244° C.

The p-nitro-N,N-bis(2-carbamoylethyl)benzamide 14 g. is dissolved in 200 ml. acetic acid in which it is hydrogenated under 40 p.s.i. using 10% palladium on charcoal as catalyst. The reaction mixture is filtered with a filter aid to remove the catalyst. The filtrate is evaporated under vacuum to give the p-amino-N,N'-bis(2-carbamoylethyl)benzamide "4ACBA" M.P. 209.5 to 210.5° C. (corr.) of Product A.

(B)

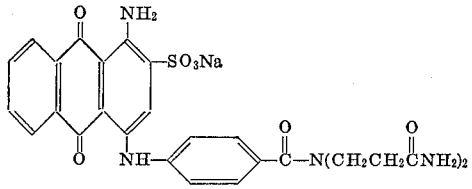

To a mixture of 8.34 g. (0.03 mole) 4ACBA prepared above, 11.7 g. (0.029 mole) of 1-amino-4-bromoanthraquinone-2-sulfonic acid, 8.4 g. sodium bicarbonate (0.1 mole) and 50 ml. water at 55–70° C. is added, over one hour small amounts of copper chloride amounting to about 3–4 grams. When the reaction is complete, the solution of product is clarified by filtration, mixed with isopropanol, filtered and dried. The residue is taken up in dimethylformamide, filtered and drowned in isopropanol. The product is isolated, washed with isopropanol and dried to give 4.6 g. dye B.

(C)

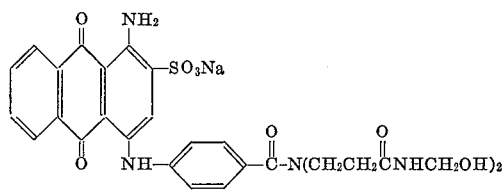

The dye B, 2.2 g. is methylolated in 50 ml. water with 15 ml. 37% formaldehyde at pH 9.5 and 65° C. for one hour. The mixture is drowned in isopropanol. The methylolated dye is isolated and dried. Yield is 0.74 g. "C."

When padded in 2% shade OWF on cotton in a manner similar to Example 8, a strong blue shade of very good fastness to light (4–5) and hot pressing (5) and perspiration is obtained. Fixation is 85%. When printed, fixation and fastness is slightly increased.

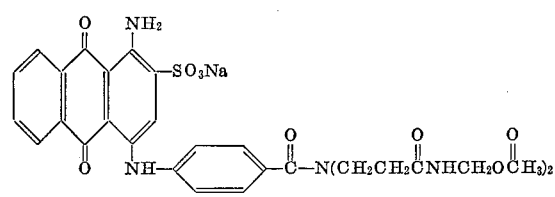

A mixture of 2.2 g. dye B, 10 ml. acetic acid, 10 ml. 37% formaldehyde and 20 ml. water is stirred at 85° C. until the reaction is complete, about 30 minutes. The reaction mixture is drowned in isopropanol, the product filtered and dried under vacuum. Yeld 1.25 g. dye D.

When padded on cotton in 3% shade OWF using the same procedure as in C above the acetylmethylolated dye is a strong blue shade with 80% fixation. Fastness to hot pressing and light is equally as good as that of "C" above.

If meta amino-N,N-bis-2-carbamoylethylbenzamide is used in the place of the p-amino analogue above, to prepare dyes similar to C and D, dyes of very similar properties are obtained. The analogues are slightly redder blues and of equal fastness to hot pressing to light, and perspiration.

EXAMPLE 18

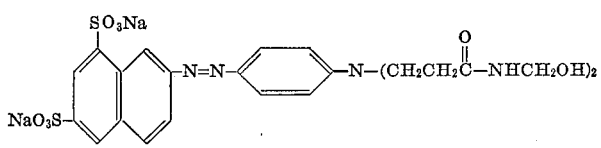

(A) 3,3′-(Phenylimino)bispropionamide

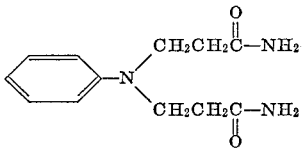

To 200 ml. of concentrated sulfuric acid maintained at 0° C. is added with stirring 22.0 (0.094 M) of 3,3′-(phenylimino)dipropionitrile and, after completion of addition, the solution is stirred for five hours at ambient temperatures, poured over ice and concentrated ammonium hydroxide added (approximately 700 ml.) slowly at 10–15° C. to pH 9. The white precipitate is collected by filtration, washed with water and dried in an atmospheric oven at 60° C. to yield 16.8 g. (76% of theory) of 3,3′-(phenylimino)bispropionamide, M 153.2–153.4° C.

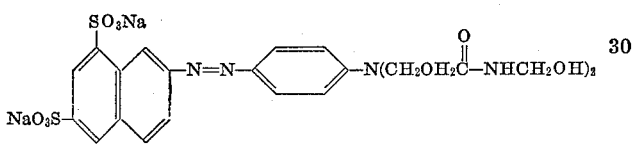

To 300 ml. of water and 25 ml. (0.3 mole) of hydrochloric acid is added 42.7 g. (0.1 mole) of 71% of aminonaphthalene-1,3-disulfonic acid: Iced to 10° C. and the whole diazotized with 7.0 g. (0.1) of $NaNO_2$ in 25 ml. of water, stirred one hour and sulfuric acid added. The solution of diazo is added to a solution of 24.4 g. (0.104) of 3,3′-phenylimino-bis-propionamide in 500 ml. of water and 30 ml. of concentrated hydrochloric acid at 10° C. To this is added 82 g. (1.0 mole) of sodium acetate, in small portions. When coupling is complete (about 10 minutes), the whole is filtered and washed with 30% brine solution. The wet cake is reslurried in 1000 ml. of water, 40 ml. (0.2) of 5 N sodium hydroxide solution is added, and the whole stirred one hour. The product is isolated by filtration and dried. It is then dissolved in 500 ml. of water, 1250 ml. of isopropanol added, heated to the boil, cooled, filtered, and the product washed with isopropanol and dried. Yield of crude is 73.2 g.; recrystallized 58.5 g.

A solution of 100 ml. of 37% formaldehyde is adjusted to pH 9.0 with 5 N sodium hydroxide solution. To this is added the above product. A solution is obtained by stirring about one hour at 27–28° C. and heating to 45° C. After cooling to 29–30° C., and stirring an additional four hours at pH 9.0, the whole is drowned in 1500 ml. of acetone. The product is isolated by decantation, 400 ml. of isopropanol added and stirred one hour. The slurry is filtered and the product washed with isopropanol and dried in a vacuum oven over $CaCl_2$. Yield is 20.31 grams.

When pad-dyed on cotton in 2% shade OWF with 20% magnesium chloride OWD, a bright orange hue is obtained of excellent fastness to wet pressing and washing.

EXAMPLE 19

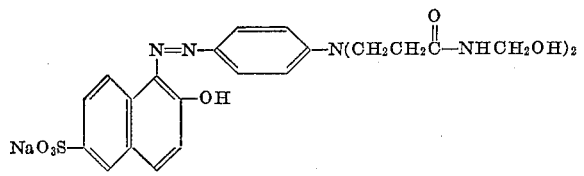

(A) 3,3′-(N-p-nitrophenylimino)bispropionamide

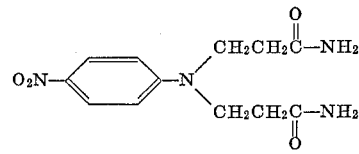

To 53 ml. of concentrated sulfuric acid is slowly added with stirring at 0° C., 6.11 g. (0.025 M) of 3,3′-(p-nitrophenylimino)dipropionitrile and, after completion of addition, the resulting solution is stirred for five hours at ambient temperatures, poured on ice, and the solution filtered through a diatomaceous earth filter. The filtrate is adjusted to pH 8 by adding concentrated ammonium hydroxide with stirring at 10–15° C., and the resulting precipitate collected by filtration, washed with 100 ml. of water and dried in vacuo at 60° C. to yield 6.64 g. (95% of theory) of 3,3′-(p-nitrophenylimino)-bispropionamide, bright yellow crystals, M 209–210° C.

(B) 3,3′-(p-aminophenylimino)bispropionamide hydrochloride

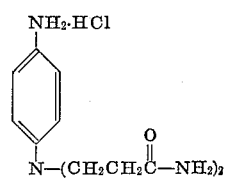

A well-stirred mixture of 400 ml. of water, 27.9 g. (0.5 M) of iron powder and 3 ml. of glacial acetic acid is warmed to 70° C. and there is then added in portions 50.2 g. (0.18 M) of 3,3′-(p-nitrophenylimino)bispropionamide. During addition, the temperature rises and is approximately 90° C. at the finish. The mixture is stirred at 90–95° C. for one-half hour after the addition is completed, cooled to 75° C. and sufficient sodium carbonate added to remove all dissolved iron salts. There is then added activated charcoal and the mixture is filtered hot through a diatomaceous earth filter. The filtrate is made just acid to Congo Red indicator paper with concentrated hydrochloric acid and cooled to 0° C. The resulting precipitate is collected by filtration and dried in vacuo at 40° C. to yield 36.1 g. (70.3% of theory) of 3,3′-(p-aminophenylimino)bispropionamide hydrochloride, pink-tinged crystals, M 203–204° C.

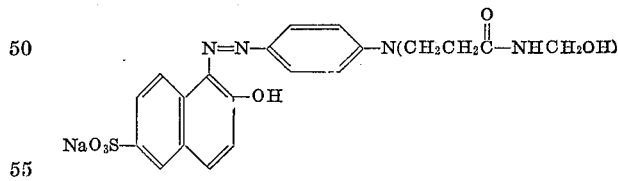

The cold aqueous diazonium solution derived from 14.34 g. (0.05 M) of 3,3′-(p-aminophenylimino)bispropionamide hydrochloride prepared in Part B, is poured into a well-stirred solution at 15° C. comprised of 300 ml. of water, 20.8 g. (0.2 M) of sodium carbonate and 11.51 g. (0.05 M) of sodium 2-hydroxynaphthalene-6-sulfonate. The solution is allowed to reach ambient temperature, then warmed to 50° C. and sodium chloride added to precipitate the dye. The precipitate is collected by filtration and washed with 400 ml. of 20% brine solution. The wet cake is dissolved in 500 ml. of water at 60° C., the solution filtered through diatomaceous earth, and the filtrate poured into 3 liters of isopropyl alcohol. The precipitate is collected by filtration, washed with isopropyl alcohol, followed by ethyl ether, and dried in vacuo at 45° C. to yield 14.01 g. of product.

A solution of 10.15 g. of the above product in 150 ml. of water is adjusted to pH 9.5, and there is then added 30 g. of 37% aqueous formaldehyde, the pH of which is first adjusted to 9.5. The reaction is stirred at 65° C. for six hours while maintaining the pH at 9.5 and then poured into a mixture of 3 liters of isopropyl alcohol and 800 ml. of ether. The mother liquor is decanted from the precipitate, and it is dissolved in 55 ml. of water for application to fiber.

A padding solution is made by mixing 20 ml. of the above dye solution with 1.5 ml. of 10% magnesium chloride solution and making the volume 50 ml. with water. The solution is padded on eight-square cotton, air-dried and cured for 1½ minutes at 350° F. The cured dyeing is soaped at the boil and dried. An attractive red brown hue is obtained. Excellent fastness (5) is shown by this dye in 3A Cotton wash test, acid and alkaline perspiration and wet pressing. Fixation of the dyestuff is 95% as evidenced by sulfuric acid extraction and spectrophotometric measurement of the dye solution.

Example 20

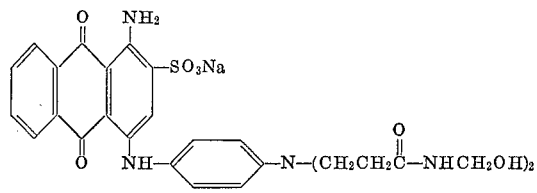

The following reagents are added in the order listed, to 150 ml. of stirred water: 1.13 g. (0.0045 M) of pulverized cupric sulfate pentahydrate; 16.88 g. (0.31 M) of sodium bicarbonate; and 27.62 g. (0.056 M) of sodium 1-amino-4-bromo-anthraquinone-2-sulfonate. There is then added, with slow stirring, a slurry, the pH of which is adjusted to 5.5 with solid sodium bicarbonate, of 22.62 g. (0.079 M) of 3,3'-(p-aminophenylimino)bispropionamide hydrochloride. The reaction is stirred at ambient temperature for one-half hour and the precipitate collected by filtration and washed with 100 ml. of 10% brine solution. The wet cake is slurried in one liter of water, and the slurry warmed with stirring to 40° C. whereupon just sufficient 5 N sodium hydroxide solution is added to effect solution. There is then added activated charcoal and diatomaceous earth, the mixture warmed to 50° C. and filtered through diatomaceous earth. The filtrate is warmed to 45° C. and there is then added, dropwise and slowly, 5 N hydrochloric acid until precipitation of the dye is complete. The precipitate is collected by filtration, washed with two 100 ml. portions of water, followed by 200 ml. of 10% brine solution and dried at 45° C. in vacuo to yield 14.71 g. of a blue solid (42% of theory).

A solution of 11.03 g. of the blue solid in 150 ml. of water is adjusted to pH 9.5 and there is then added, after first adjusting its pH to 9.5, 30 g. (0.37 M) of 37% aqueous formaldehyde. The solution is stirred at 65° C. for six hours while maintaining the pH at 9.5, and then poured into a mixture of 3 liters of isopropyl alcohol and 1.6 liters of ethyl ether. The precipitate is collected by filtration, washed with ethyl ether and dried in vacuo at ambient temperatures to yield 9.24 g. of blue dye.

A pad-bath is prepared by mixing 0.75 g. of the blue dye with water adding 1.5 ml. of 10% ammonium sulfate solution, making up to 50 ml. and letting it stand; then adding 7 ml. of alcohol and padding on 80-square cotton. The padded cotton is cured for 1½ minutes at 350° F., soaped at the boil, rinsed, and dried. The cotton is dyed a grey-blue hue which has excellent fastness to wet pressing, washing and perspiration. Fixation is 82%.

EXAMPLE 21

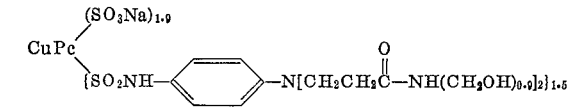

To 45 ml. of chlorosulfonic acid is added, with stirring and cooling so that the temperature does not exceed 30° C., 8.71 g. (0.015 M) of copper phthalocyanine, and the reaction mixture heated to 140° C., and maintained there for two hours. It is then cooled to ambient temperature, poured into a well-stirred mixture of 75 ml. of water, 450 g. of ice and 42 g. of sodium chloride, and the resulting precipitate is collected by filtration and washed with 100 ml. of ice-water. The wet sulfonyl chloride cake is then slurried in ice water, the pH adjusted to 5.5, and there is then added a pH 5.5 slurry of 8.4 g. (0.03 m.) of 3,3'-(p-aminophenylimino)bispropionamide in 40 ml. of ice-water. The reaction is stirred at 0–5° C. while maintaining the pH at 6.5 for one hour, filtered and the cake washed with 50 ml. of water and dried in vacuo at 45° C. to yield 16.9 g. of solid.

A solution of 12.97 g. of the above solid in 150 ml. of water is adjusted to pH 9.5 and there is then added 32.4 g. of 37% aqueous formaldehyde, the pH of which is first brought to 9.5. The reaction is stirred at 65° C. for six hours while maintaining the pH at 9.5, filtered and the filtrate poured into 3 liters of well-stirred isopropyl alcohol. The precipitate is collected by filtration, washed with 250 ml. of ethyl ether, and dried in vacuo at ambient temperatures to yield 12.61 g. of green-blue dye.

When pad-dyed on cotton in a 1.5% OWF shade at a pH of 6.7 using 10% OWD of ammonium sulfate, a turquoise hue having 96% fixation is obtained. At the same dye strength, a pH of 6.6 and 20% OWD of ammonium sulfate give 95% fixation.

EXAMPLE 22

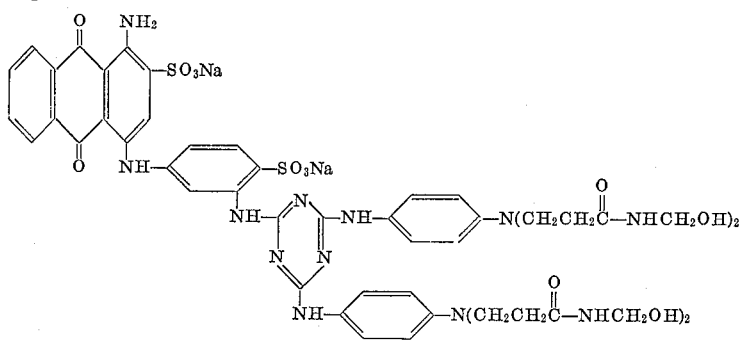

A solution of 13.34 g. (0.025 M) of the blue dye derived from the condensation of bromamine acid and m-phenylendiamine sulfonic acid is cooled to 0–5° C. and there is then added, with stirring, while maintaining the pH at 5.5, a solution of 4.61 g. (0.025 M) of cyanuric chloride in 50 ml. of acetone. The solution is kept at 0–5° C. and pH 5.5 for two hours. A slurry of 15.77 g. (0.055 M) of 3,3'-(p-aminophenylimino)dipropionamide hydrochloride in 50 ml. of water is added. The temperature is then raised to 90–92° C. over 1.5 hours and maintained there for one hour, keeping the pH constantly at 6.0. The solution is cooled to ambient temperatures, filtered through diatomaceous earth and the filtrate poured into 1.5 liters of well-stirred isopropyl alcohol. The precipitate is collected by filtration, washed with 1.5 liters of isopropyl alcohol and dried in an atmospheric over at 55° C. to yield 24.08 g. of blue powder. A sample of this powder is recrystallized from a dimethylformamide isopropyl alcohol mixture.

A 16.63 g. sample of the above powder is dissolved in 150 ml. of water, the pH adjusted to 9.5, and there is then added a pH 9.5 solution of 48.64 g. of 37% aqueous formaldehyde. The mixture is warmed at 65° C. for six hours, maintaining a constant pH of 9.5 with 20% NaOH solution as needed, cooled to ambient temperature, filtered through diatomaceous earth, and the filtrated poured into 3 liters of well-stirred isopropyl alcohol. The resulting precipitate is collected by filtration, washed with 500 ml. of isopropyl alcohol and dried in vacuo at ambient temperatures to yield 16.67 g. of blue dye product.

EXAMPLE 23

Three grams of the dye of Example 12 are dissolved in 11 ml. of water and added to an emulsion made by homogenizing the following: 20 grams of sodium alginate granules stirred to a paste with 545 ml. of water; 10 grams of a surfactant which is sodium fatty acid amide sulfonate; and 445 grams of a petroleum solvent distilling between 321 and 388° F.

To this is added 6 ml. of a 10% of ammonium chloride. This is printed on seven-inch wide eighty-square cotton. The print is dried at 160° F. for 5 minutes. It is acid-aged for 2½ minutes in an acetic acid steam vapor mixture. It is then cured for 1½ minutes at 350° F., followed by soaping at the boil for five minutes and drying. A full bright turquoise print is obtained.

EXAMPLE 24

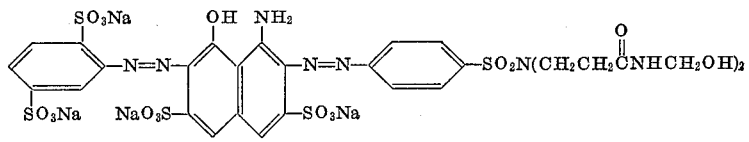

(A) First coupling.—To 160 ml. 5 N hydrochloric acid and ice is added 62.3 g. "4ACBS." Diazotization is effected by the addition of a solution of 14.4 g. sodium nitrite in a minimum amount of water. Excess nitrite is destroyed with sulfamic acid. The solution of diazo is added to a suspension of 77.8 g. H-acid and the mixture stirred until coupling is complete. The pH is adjusted to 7.5 with 5 N caustic soda. The whole is heated to 65° C. and salted with sodium chloride. The mono azo dye is isolated by filtration and dried.

(B) Second coupling.—Aniline - 2,5 - disulfonic acid, 9.07 g., is added to 18 ml. 5 N hydrochloric acid. The whole is cooled to 0° C. with ice and diazotized by the addition of a solution of 1.59 g. sodium nitrite in a minimum amount of water. The diazo solution is added to a mixture of 17.2 g. monoazo dye prepared in (A), and 10 g. sodium bicarbonate. The pH is adjusted to 8 with 5 N caustic soda solution and stirred until coupling is complete. The whole is heated to 65° C., salted, cooled to ambient temperature and the dye isolated by filtration and dried. It is desalted by treating the dye cake with dimethylformamide, clarifying to remove salt and drowning the dye filtrate in isopropanol. The diazo dye product is isolated and dried. Yield is 7.5 g.

(C) A mixture of 5 g. dye prepared in B in 50 ml. water and 15 ml. 37% formaldehyde solution, is adjusted to pH 9.5 and maintained at this pH at 65–70° C. for one hour. It is cooled, poured into one liter of isopropanol, collected and dried. Yield is 4.6 methylolated diazo dye.

(D) A 1.5 g. smaple of Product C is dissolved in 48 ml. water. The pH is adjusted to pH 6.5 with dilute hydrochloric acid and 2 ml. 10% ammonium chloride solution added. This is padded on 80 x 80 cotton percale, dried and cured for 1½ minutes at 350° F. The cotton is soaped 5 minutes at the boil in 0.2% soap solution, rinsed with water and pressed dry. A deep navy blue shade is obtained, fast to washing, perspiration and wet pressing. Fixation of the dye is 85–90%.

The methylolated dye C also has affinity for viscose rayon, modulus rayon and the more difficultly dyeable polynosic rayon.

If in place of aniline-2,5-disulfonic acid, an equivalent amount of orthanilic acid is used above in B and procedures C and D folowed, a navy blue shade is likewise obtained of equal fixation.

By switching to sulfanilic acid in place of aniline disulfonic acid, a black shade of 95% is fixation is obtained. A black is also obtained by substituting 3ACBS for 4ACBS and using p-nitroaniline as the diaze in place of aniline disulfonic acid.

EXAMPLE 25

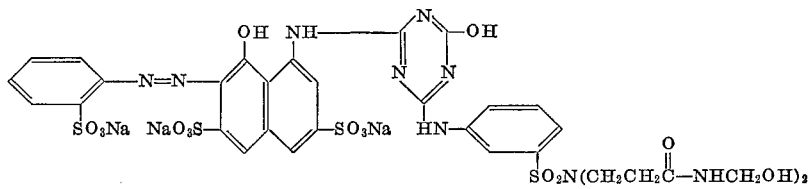

To a slurry of 15.97 g. (0.05 M) H-acid is added just sufficient 5 N sodium hydroxide to effect solution and the solution is treated with charcoal and diatomaceous earth, filtered and the filtrated cooled to 0° C. and adjusted to pH 5.5. There is then added dropwise with stirring a filtered solution of 9.22 g. (0.05 M) of cyanuric chloride in 100 ml. of acetone. The pH is maintained at 5.5 throughout the addition with 5 N sodium hydroxide as required. The reaction is stirred at 0–5° C. for thirty minutes, and there is then added all at once a slurry of 15.72 g. (0.05 M) of 3,3'-metanilyliminobispropionamide in 50 ml. of water and 150 ml. of acetone. The ice-bath is removed and the temperature raised to 60° C. over a period of 2.5 hours while maintaining the pH at 5.5. After stirring at 60° C. for 1.5 hours, the solution is treated wtih charcoal and filtered hot through diatomaceous earth. The filtrate is poured into 3 liters of well-stirred isopropyl alcohol, and the precipitate collected by filtration and washed with 500 ml. isopropyl alcohol followed by 500 ml. acetone. The resulting semi-dry triazinyl intermediate is placed into 300 ml. of water, the pH adjusted to 7.0 and there is then added sufficient solid sodium carbonate to give pH 9.9. To the coupling component solution thus prepared, there is added with stirring the cold, aqueous diazonium solution derived from 8.66 g. (0.05 M) orthanilic acid. The reaction is stirred several hours at ambient temperatures and then warmed to 60–65° C. The pH is adjusted to 7.0–7.5 with dilute hydrochloric acid and solid sodium chloride is added in portions with stirring. The salted dye is collected by filtration, washed with 250 ml. of 20% aqueous sodium chloride and dried at 65° C. in an atmospheric oven to yield 39.81 g. red product (real basis).

A solution of 45.59 g. of red dye prepared as above in 350 ml. of water is adjusted to pH 9.5 and there is then added a pH 9.5 solution of 81.1 g. (1.0 M) of 37% aqueous formaldehyde. The mixture is stirred at 65° C. for six hours while maintaining a pH of 9.5, filtered hot through diatomaceous earth, and the filtrate poured into 4 liters of well-stirred isopropyl alcohol. The precipitate is collected by filtration, washed with 500 ml. of isopropyl alcohol followed by 300 ml. ether, and dried in vacuo at ambient temperatures to yield 32.0 g. red dye containing 5.72% bound formaldehyde.

A 2% dyeing on cotton with 10% ammonium chloride OWD as a catalyst using the pad dyeing procedure affords a bright, blue shade red with a fixation of 90%.

If in the above procedure, instead of 3,3'-metanilyliminobispropionamide, 3,3' - sulfanilyliminobispropionamide ("4ACBS") is used, the p-isomer is obtained. This dye gives a similar blue red shade on cotton of good fastness to wet pressing and perspiration.

If instead of 3,3'-metanilyliminobispropionamide, an equivalent amount of iminobispropionamide is used, a dye is obtained which gives a slightly brighter and stronger blue-red shade on cotton when dyed using 4 g. per liter ammonium chloride and curing 1½ minutes at 350° F.

EXAMPLE 26

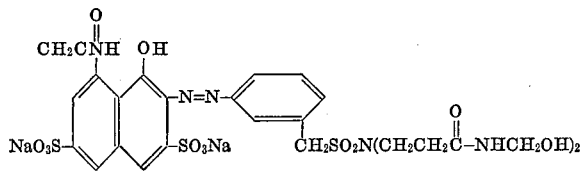

If, in Example 2, one substitutes 0.05 M of the diazonium salt derived from 3,3'-[(m-aminobenzyl)sulfonyl-imino]dipropionamide (prepared from 3-nitrobenzylsulfonylchloride in an analogous manner to the amine of Example 1-C), there is obtained a product which dyes cotton in a blue-red shade exhibiting very good fastness to washing and perspiration.

EXAMPLE 27

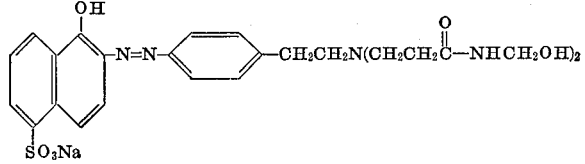

If, in Example 9, there is substituted for the diazo component in the coupling, diazotized 3,3'-(p-aminophenethylimino)dipropionamide, one obtains a dye giving orange-red shades of high wet-fastness on cotton. The amine used as the diazonium component is prepared by adding two moles of acrylonitrile to 3-(p-nitrophenyl)ethylamine, reducing the nitro group and hydrolyzing the bis-nitrile to the bis-carboxamide.

EXAMPLE 28

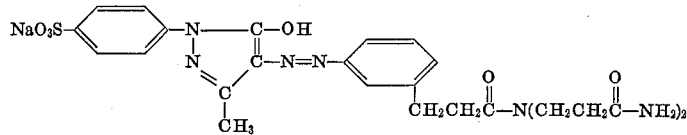

If, in Example 16-D, there is substituted 0.05 M of the diazonium salt derived from m-amino-N,N-bis(2-carbamoylethyl)hydrocinnamamide [prepared from beta-(3-nitrophenyl)propionyl chloride in a manner analogous to the amine of Example 16-C], there is obtained a dye which gives a slightly less green shade of yellow on cotton, and is equally fast toward pressing, washing and perspiration.

EXAMPLE 29

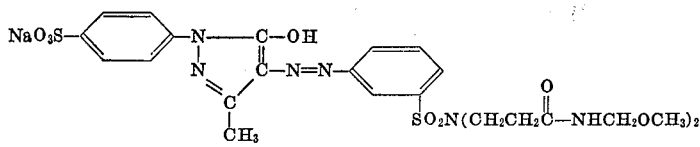

A solution of 5.0 g. of the dye prepared in Example 2 in 150 ml. of methanol is heated with stirring to the reflux point, and there is then added dropwise sufficient concentrated hydrochloric acid to give a pH of 6.0. The solution is refluxed for 15 minutes, cooled rapidly to 30° C. and poured into 3 liters of well-stirred isopropyl alcohol. The product is collected by filtration, washed with 500 ml. of acetone and dried in vacuo at ambient temperatures to yield 5.9 g. of yellow dye. This product, when applied to cotton by the usual methods, gives bright yellow dyeings of superior wash and perspiration fastness.

EXAMPLE 30

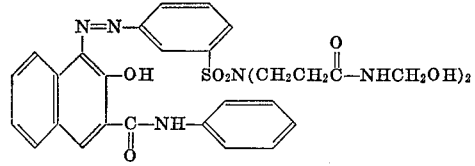

To a mixture of 500 ml. of methanol and 500 ml. of dioxane is added 2.2 g. (0.06 M) of sodium hydroxide and 2.9 g. (0.03 M) of sodium carbonate (each dissolved in a minimal amount of water), followed by 14.5 g. (0.055 M) of 3-hydroxy-2-naphthanilide. The solution is cooled to 10° C., and there is added the cold, aqueous diazonium solution derived from 15.7 g. (0.05 M) of 3,3'-(metanilylimino)bispropionamide. The addition of diazonium is alternated with addition of sodium carbonate as necessary to maintain pH 8.0. After stirring 0.5 hour, the precipitate is filtered, washed with 1.0 liter of water and dried in vacuo at ambient temperatures to yield 23.5 g. (80% of theory) of orange dye.

A solution of 16.1 g. (0.027 M) of the above dye in 200 ml. of ethanol is treated with a pH 9.5 solution of 50.1 g. (0.062 M) of 37% aqueous formaldehyde. The reaction is stirred at 65° C. for six hours while maintaining the pH at 9.0–9.5 with dilute aqueous sodium hydroxide as needed, cooled to 30° C. and poured into 2.5 liters of water. The precipitate is filtered, washed with 1.0 liter of water and dried in vacuo at 25° C. to yield 16.0 g. (100% of theory) of an orange dye which analyzes as containing 2.09 methylol groups.

When applied to nylon, silk and wool, or to acrylonitrile-vinylpyrrolidone copolymer, by the standard dyeing procedures for these fibers, the above dye yields bright orange shades of superior fastness properties.

EXAMPLE 31

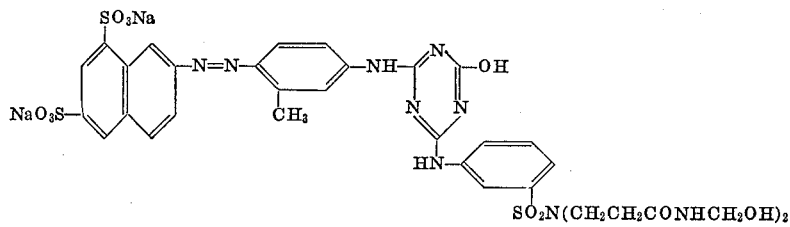

(A) Preparation of 3,3'-{[N-(4,6-dichloro-s-triazin-2-yl)metanilyl]imino}bispropionamide

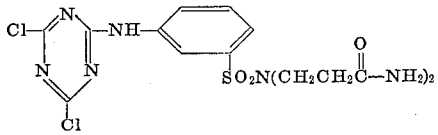

A solution at 0–5° C. of 13.83 g. (0.075 M) of cyanuric chloride in 400 ml. of acetone is treated with 23.58 g. (0.075 M) of 3,3'-metanilyliminobispropionamide. There is then added over 15 minutes a solution of 6.30 g. (0.075 M) of sodium bicarbonate in 60 ml. of cold water. After one-half hour, the precipitate is filtered, washed with 450 ml. cold water and dried in vacuo at 25° C. to yield 32.8 g. (94.5% of theory) of a cream-colored powder, M.P. 220–2° C. (effervescence).

(B) Preparation of dye product.—A mixture of 11.6 g. (0.025 M) of the azo dye obtained by coupling diazotized Amino G acid with m-toluidine, 11.55 g. (0.025 M) of 3,3'-{[N(4,6-dichloro-s-triazin-2-yl) metanilyl]imino}bispropionamide and 100 ml. of water is heated with stirring to 83° C. while maintaining a pH of 6.0. After obtaining a negative test for the primary aromatic amino group, the mixture is cooled to 25° C., filtered and the filtrate poured into stirring ethanol. The precipitate is collected by filtration, washed with ethanol and dried at 60° C. to yield 20 g. of orange dye assaying 91% (89% of theory yield).

A solution of 10.0 g. of the above dye in 100 ml. of water is adjusted to pH 9.5 and there is added 20.0 g. of 37% aqueous formaldehyde, the pH of which is first adjusted to 9.5. The mixture is stirred at 65° C. for six hours while maintaining a pH of 9.5, cooled, filtered and the filtrate poured into 3 l. of stirring isopropyl alcohol. The precipitate is collected by filtration, washed with isopropyl alcohol and dried in vacuo at ambient temperatures to yield 7.5 g. of an orange powder analyzing for 1.71 methylol groups per mole.

When dyed or printed on cotton in 2% shade using 10% OWD NH₄Cl, a reddish-yellow hue is obtained of very good fastness to wet-pressing, washing and crocking.

EXAMPLE 32

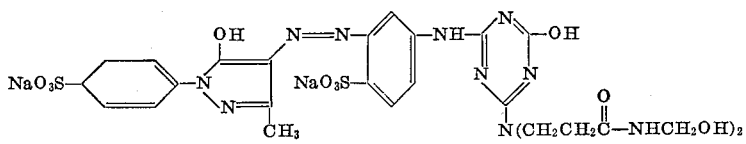

(A) To 600 ml. water is added 77.19 g. (0.3 mole) iminobispropionamide sulfate. The solution is cooled to 5–7° C. and adjusted to pH 5.4 with 50% caustic soda solution. The pH is maintained at 5–5.5 with 15% sodium carbonate solution while 55.32 g. (0.3 mole) cyanuric chloride in 300 ml. acetone is added gradually over a half hour. To this is added 56.4 g. (0.3 mole) 2,4-diaminobenzenesulfonic acid in 150 ml. water. The whole is stirred to ambient temperature and warmed to 55° C. The pH is 5–5.5. The product is salted out with 225 g. salt, filtered, washed with 20% salt solution and 100 ml. water, and dried. The crude product is dissolved in 500 ml. water at 75° C., clarified with a filter aid and cooled to 5° C. The precipitated adduct is isolated washed with water and dried to give 74.3 g. of 90.3% real product "A."

(B) To 150 ml. water at 60° C. added 50.82 g. (0.1 mole) adduct A. The partial solution is poured onto 100 ml. ice; 100 ml. 5 N hydrochloric acid and 100 ml. water are added. At 5° C., 7.59 g. (0.11 mole) sodium nitrite in 25 ml. water is added at once. When diazotization is complete, sulfamic acid is added to destroy excess nitrite.

To 27.97 g. (0.11 mole) 3-methyl-1-(4'-sulfophenyl) 5-pyrazolone in 600 ml. water adjusted to pH 7.0 with 5 N caustic soda solution, clarified, is added 53 g. sodium carbonate solution. The solution of diazo prepared above is added at once and the coupling stirred until complete.

To isolate the dye, the slurry is heated to 65° C., 500 ml. water at 65° C. added, the dye solution clarified and salted with 200 g. salt. On cooling to ambient temperature, the dye is filtered, washed with 100 ml. 20% salt solution and 100 ml. 10% salt solution and dried. Yield is 85.7 g. of 81.3% real dye B.

(C) Methylolation of dye B.—To 250 ml. water is added 34.18 g. dye B; pH is 9.5. To this is added 65.2 g. 37% formaldehyde. The whole is heated to 65° C. The reaction mixture is kept at 65° C. and pH 9–9.5 until methylolation is complete. The pH is adjusted to 7.5 with dilute hydrochloric acid. The solution of methylolated dye is first clarified and then drowned with slurring in 3.8 liters isopropanol. The dye is filtered and dried to yield 29.9 g.

To 48 ml. water is added 1.5 g. dye C. The pH is adjusted to 6.5 with dilute hydrochloric acid 2 ml. ammonium chloride solution is added. This dye solution is padded on 80² cotton. The cotton is air-dried, cured 1½ minutes at 350° C. and soaped 5 minutes at the boil. A bright yellow of 90% fixation is obtained, fast to wet pressing, dry crocking, washing and perspiration.

EXAMPLE 33

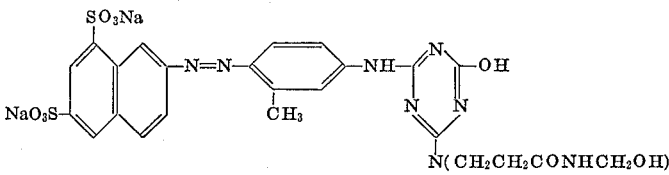

(A) Preparation of 2[N,N-bis(2-carbamoylethyl)amino]-4,6-dichloro-s-triazine

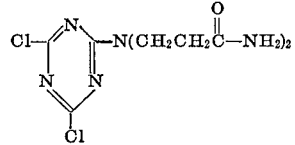

A solution of 25.7 g. (0.1 M) of 3,3'-iminobispropionamide sulfate in 60 ml. of water is neutralized to pH 6.9 with 5 N NaOH, and then treated over 15 minutes at 0–5° C. while maintaining a pH of 6.5±0.4 with a solution of 9.22 g. (0.05 M) of cyanuric chloride in 40 ml. of acetone. After an additional one hour of stirring at 0–5° C., the precipitate is filtered, washed with 500 ml. of cold water, sucked dry and further dried in vacuo at 50° C. to yield 14 g. (90% of theory) of product, M.P. 201° (dec.).

(B) Preparation of dye product.—If in Example 31–B, one uses 0.025 M of 2-N,N-bis(2-carbamoylethyl)amino-4,6-dichloro-s-triazine as the triazine component, there is obtained a dye containing 2.95% formaldehyde and yielding similar shades when dyed or printed on cotton.

EXAMPLE 34

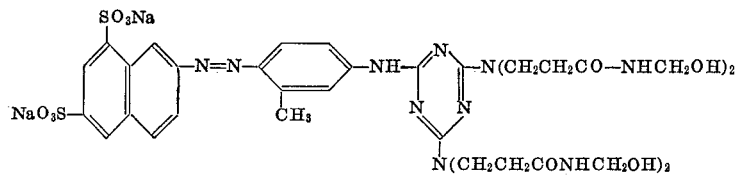

(A) If, in the procedure of Example 31–A one employs 51.4 g. (0.2 M) of 3,3′-iminobispropionamide instead of the propionamide used therein and heats the reaction from 0–65°, the compound below is obtained:

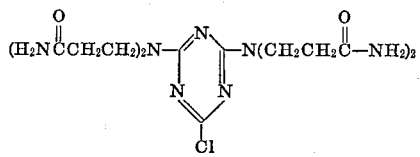

(B) Preparation of dye product.—If the product from A above is substituted into the procedure of Example 31–B in place of the triazine used therein, the dye of the above formula is obtained.

EXAMPLE 35

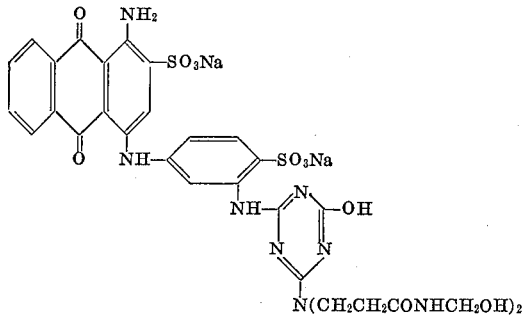

(A) Preparation of 3,3′-iminobispropionamide sulfate

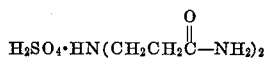

While maintaining a temperature of less than 30° C., 39.34 g. (0.319 M) of β,β′-iminobispropionitrile is added over 25 minutes to a stirred mixture of 14 ml. of water and 102 ml. of concentrated sulfuric acid, and the whole stirred at 20°–30° C. for 24 hours. The reaction mixture is then poured into 1.6 l. of ethanol stirred at 5° C. and, after 1.5 hours, the precipitate is collected by filtration, washed with 2.5 l. of ethanol and dried in vacuo at 50° C. There is obtained 76.6 g. (94% of theory) of white crystals, M.P. 158° C.

(B) Preparation of dye product.—A solution of 21.34 g. (0.04 M) of the blue dye derived from the condensation of bromamine acid and m-phenylene diamine sulfonic acid is cooled to 0°–5° C., the pH adjusted to 5.4, and there is then added, with stirring, while maintaining the pH at 5.3–5.5 with aqueous $Na_2CO_3$, a solution of 7.38 g. (0.04 M) of cyanuric chloride in 75 ml. of acetone. The solution is kept at 0–5° C. and pH 5.5 for an additional 0.5 hour, and there is then added all at once, a cold, pH 5.2 (adjusted with 50% NaOH) solution of 22.64 g. (0.088 M) of 3,3′-iminobispropionamide sulfate in 50 ml. of water. The mixture is then heated to 76° C. over 40 minutes, and maintained at 77°–79° C. for 0.5 hour all the while maintaining a pH of 5.3–5.5. The solution is clarified, warmed to 70° C. and salted to give, after cooling to 25° C., filtering, washing and drying at 60° C. 33.4 g. of blue dye. The crude dye is purified from DMF/iso-$C_3HOH$ to yield 25.8 g. of blue dye analyzing for one chlorine atom and one iminobispropionamide residue.

(C) A sample of 8.75 g. of the purified dye is methylolated for six hours at 65° C. and pH 9.5 in the usual manner to give 7.10 g. of blue dye containing 1.8 methylol groups.

A 2% dyeing of Dye C on cotton with a 10% OWD $NH_4Cl$ catalyst gives reddish-blue hues of high wash- and wet-pressing fastness.

EXAMPLE 36

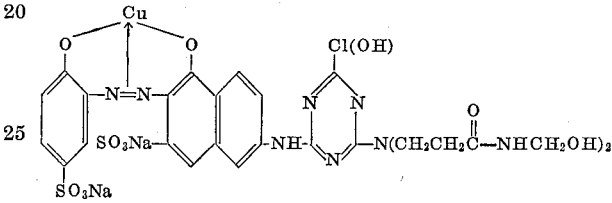

The coupling product of 1-amino-2-hydroxybenzene-5-sulfonic acid into J acid (81.2 g. of 57.2% dye; 0.1 mole) is dissolved with stirring in 500 ml. of water and adjusted to pH 5.5 with 5 N hydrochloric acid solution. The whole is cooled to 0–5° C. with an ice bath. A solution of 18.45 g. (0.1 mole) cyanuric chloride in a minimum amount of acetone is added at a rate so that the temperature does not rise above 10° C. (about 30 minutes). The pH during the addition is maintained at 5.5 by addition of dilute sodium carbonate solution.

After about one hour with the pH remaining constant, a preneutralized (pH 5.5) solution of 25.7 g. (0.1 mole) of iminobispropionamide sulfate in a minimum amount of water is added in one portion. The reaction is allowed to warm to room temperature at which point the pH drops slowly. The reaction is warmed to 40° C. and maintained there for 2 hours keeping the pH at 5.5 by the use of dilute sodium carbonate solution. After the pH is stabilized, the whole is adjusted to 7.5 and the reaction heated to 60° C. Common salt, 120 g., is added. The reaction is allowed to come to room temperature overnight. The solids are filtered, washed with saturated brine, water and acetone, in that order, and dried under vacuum, resulting in 72 grams of 53% pure dye.

The above dye (67.7 g., 0.05 mole) is dissolved with stirring in 500 ml. water and 8.2 g. anhydrous sodium acetate added in one portion. The reaction is heated to 65° C., 12.5 g. $CuSO_4 \cdot 5H_2O$ added, and the mixture heated at 80–85° C. for 2 hours. The pH is then adjusted to 7.5 using 5 N sodium hydroxide solution. 100 g. common salt is added slowly. The reaction is allowed to cool to room temperature overnight with stirring. The dark solids are filtered, washed with saturated brine, water acetone and dried under vacuum. The dye is taken up in hot dimethylformamide, filtered, drowned in isopropanol, washed with isopropanol, sucked dry, and dried under vacuum. This yields 28.9 grams of 81% pure dye.

The dye product thus obtained (19.3 g., .02 mole) is dissolved with stirring in 200 ml. 37% formaldehyde and the pH adjusted to 7.5. The mixture is allowed to stir for 2 days at room temperature, drowned in isopropanol, filtered, washed with isopropanol and dried under vacuum, yielding 16.4 grams of 79% pure methylolated dye.

When the above dye is padded on cotton and fixed according to the pad-dyeing procedure a bright violet shade is obtained having excellent fixation and fastness properties.

3,503,953

6. The compound of the formula

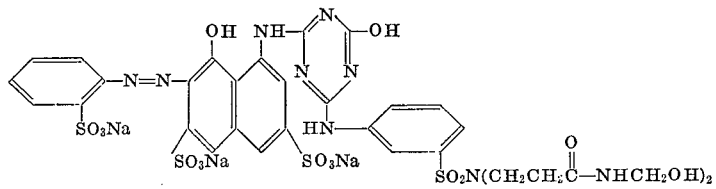

7. The compound of the formula

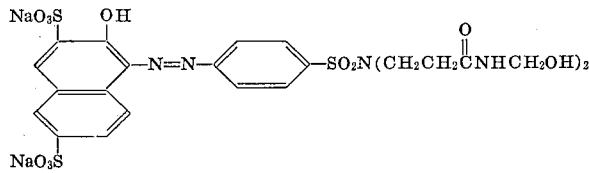

8. The compound of the formula

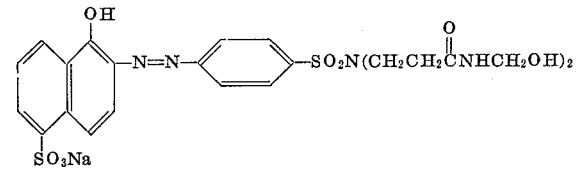

9. The compound of the formula

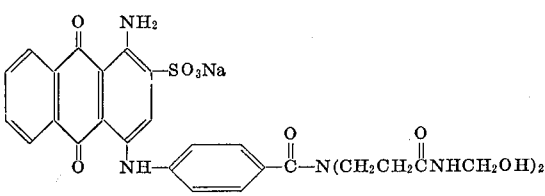

10. The compound of the formula

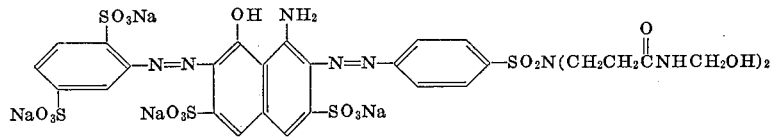

11. The compound of the formula

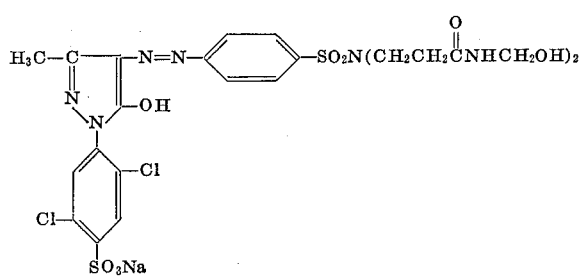

(References on following page)

I claim:
1. A compound of the formula:

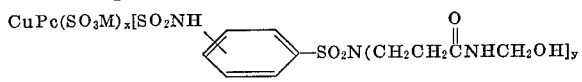

wherein D is the residue of an organic dye moiety, Y is a bridging group which is attached to an aromatic or heterocyclic carbon atom of D and is selected from the group consisting of a covalent bond, sulfonyl, alkylenesulfonyl, alkyleneoxy, alkylenethio, carbonyl, alkylenecarbonyl and alkylene, the alkylene radicals in Y having 1–2 carbon atoms; R is a member selected from the group consisting of hydrogen, acyl of 1–4 carbon atoms and alkyl of 1–4 carbons; R' is individually selected from the group consisting of hydrogen and the radical "—CH$_2$OR" and $n$ is a positive integer less than three.

2. A compound of the formula

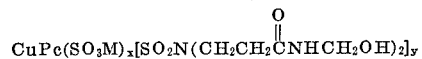

wherein CuPc is the residue of a copper phthalocyanine dye moiety, M is a cation, $x$ is an integer of 2 to 3, $y$ is an integer of 2 to 1 and X plus $y$ equals 4.

3. A compound of the formula

CuPc(SO$_3$M)$_x$[SO$_2$N(CH$_2$CH$_2$C(O)NHCH$_2$OH)$_2$]$_y$ wherein CuPc is the residue of a copper phthalocyanine dye moiety, M is a cation, $x$ is an integer of 2 to 3, $y$ is an integer of 2 to 1 and $x$ plus $y$ equals 4.

4. The compound of the formula

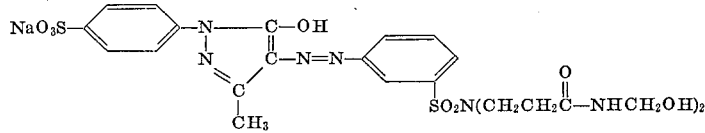

5. The compound of the formula

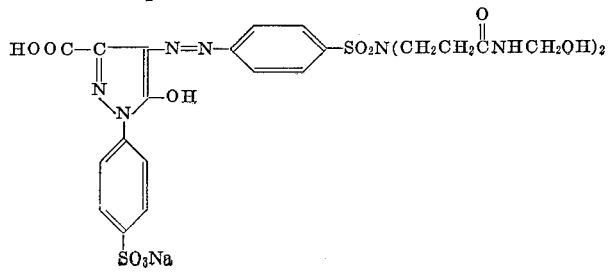

References Cited

UNITED STATES PATENTS 2,346,013  4/1944  Dickey _____ 260—199 XR

FOREIGN PATENTS 805,562  12/1958  Great Britain.

OTHER REFERENCES

Frick et al., American Dyestuff Reporter, vol. 51, No. 23, pp. 45 to 48.

FLOYD D. HIGEL, Primary Examiner

U.S. Cl. X.R.

8—41, 4, 7, 39, 40, 54.2; 117—138.8, 143, 152; 260—558, 196, 249, 204, 249.8, 249.5, 561, 146, 162, 201, 185, 191, 372, 314.5, 283, 293, 240, 244, 307, 308, 343, 386, 396, 310, 256.4, 297, 465.8, 465, 556, 148, 199, 249.6, 392